(12) United States Patent
Okumura et al.

(10) Patent No.: US 6,214,307 B1
(45) Date of Patent: Apr. 10, 2001

(54) EXHAUST GAS PURIFYING CATALYST AND EXHAUST GAS PURIFYING METHOD

(75) Inventors: Akihisa Okumura; Masao Hori; Hideki Gotoh; Makoto Horiuchi, all of Himeji (JP)

(73) Assignees: ICT Co., Ltd., Osaka (JP); International Catalyst Technology Incorporated, Ridgefield Park, NJ (US)

(*) Notice: Subject to any disclaimer, the term of this patent is extended or adjusted under 35 U.S.C. 154(b) by 0 days.

(21) Appl. No.: 08/973,684

(22) PCT Filed: Apr. 9, 1997

(86) PCT No.: PCT/JP97/01211

§ 371 Date: Dec. 11, 1997

§ 102(e) Date: Dec. 11, 1997

(87) PCT Pub. No.: WO97/37761

PCT Pub. Date: Oct. 16, 1997

(30) Foreign Application Priority Data

| Apr. 11, 1996 | (JP) | ................................ 8-089716 |
| May 20, 1996 | (JP) | ................................ 8-125162 |
| Nov. 29, 1996 | (JP) | ................................ 8-320516 |
| Nov. 29, 1996 | (JP) | ................................ 8-320531 |

(51) Int. Cl.[7] .............. B01J 8/02; B01J 27/053; C01B 21/20

(52) U.S. Cl. .................. 423/213.5; 423/213.7; 423/239.1; 502/223; 502/217; 502/325; 502/339; 502/328

(58) Field of Search .................. 502/223, 217, 502/325, 339, 340, 328; 423/213.7, 213.5, 239.1

(56) References Cited

U.S. PATENT DOCUMENTS

| 4,297,328 | | 10/1981 | Ritscher et al. . | |
| 4,427,576 | * | 1/1984 | Dupin ................................. | 502/218 |
| 5,227,356 | * | 7/1993 | Hess et al. ........................ | 502/217 |
| 5,459,119 | * | 10/1995 | Abe et al. ......................... | 502/326 |
| 5,821,190 | * | 10/1998 | Kurabayashi et al. ........... | 502/178 |

FOREIGN PATENT DOCUMENTS

| 1313176 | * | 1/1993 | (CA) . |
| 56-54173 | | 12/1981 | (JP) . |
| 57-13328 | | 3/1982 | (JP) . |
| 60-125250 | | 7/1985 | (JP) . |
| 63-100919 | | 5/1988 | (JP) . |
| 1-293049 | | 12/1990 | (JP) . |
| 2-127628 | | 5/1991 | (JP) . |
| 2-229620 | | 10/1991 | (JP) . |
| 4-277369 | | 10/1993 | (JP) . |
| 5-31173 | | 2/1994 | (JP) . |
| 5-296870 | | 10/1994 | (JP) . |
| 6-31884 | | 2/1995 | (JP) . |

(List continued on next page.)

Primary Examiner—Steven P. Griffin
Assistant Examiner—Christina Ildebrando
(74) Attorney, Agent, or Firm—Nixon & Vanderhye P.C.

(57) ABSTRACT

An exhaust-gas-purifying catalyst is made by depositing on a support iridium serving as a catalyst active substance, sulfur for improving the catalyst activity of iridium and, if necessary, platinum. The sulfur is preferably contained as a sulfate. The exhaust-gas-purifying process of the present invention is a process in which exhaust gas from an internal combustion engine is allowed to pass through the exhaust-gas-purifying catalyst with the exhaust-gas temperature being set in the range of 200° C. to 700° C. at the inlet of the exhaust-gas-purifying catalyst. The above-mentioned composition and process provide an activity for purifying exhaust gas, especially for eliminating nitrogen oxides in an oxidizing atmosphere, in a wide temperature range, allow high heat-resistance and durability, and consequently, are superior in practical use.

11 Claims, 8 Drawing Sheets

FOREIGN PATENT DOCUMENTS

| | | |
|---|---|---|
| 7-80315 | 3/1995 | (JP) . |
| 6-88378 | 4/1995 | (JP) . |
| 136463 | 5/1995 | (JP) . |
| 7-136463 | 5/1995 | (JP) . |
| 7-155555 | 6/1995 | (JP) . |
| 6-246337 | 9/1995 | (JP) . |
| 7-33845 | 2/1996 | (JP) . |
| 7-71422 | 3/1996 | (JP) . |
| WO93/08383 * | 4/1993 | (WO) . |

* cited by examiner

EXHAUST GAS PURIFYING CATALYST AND EXHAUST GAS PURIFYING METHOD

FIELD OF THE INVENTION

The present invention relates to an exhaust-gas-purifying catalyst for reducing hydrocarbons, carbon monoxide and nitrogen oxides, especially nitrogen oxides, in exhaust gas released from combustion engines, such as gasoline engines, diesel engines, boilers and industrial plants, and concerns a process for purifying exhaust gas.

BACKGROUND OF THE INVENTION

Hydrocarbons (hereinafter, referred to as HC), carbon monoxide (hereinafter, referred to as CO) and nitrogen oxides (hereinafter, referred to as NOx), contained in exhaust gas discharged from internal combustion engines such as cars, boilers and industrial plants, form the main cause of air pollution. Especially, since NOx form the cause of acid rain, the development of a technique for removing NOx from exhaust gas is considered to be an urgent task.

Conventionally, in the case of exhaust gas from gasoline engines, such as those of cars, a method has been known in which exhaust gas is treated by a so-called three way catalytic converter using platinum or other elements so as to remove NOx together with HC and CO. This method is extremely effective when the air-fuel ratio (hereinafter, referred to as A/F) is set in the vicinity of the stoichiometrical air-fuel ratio (A/F=14.6).

In recent years, lean-burn engines have been gained attention as a means for improving fuel economy and for reducing $CO_2$. However, such engines have a greater A/F than the stoichiometrical air-fuel ratio, and form an atmosphere in which an excessive amount of oxygen exists in the exhaust gas (hereinafter, referred to as an "oxidizing atmosphere") Since an excessive amount of oxygen exists as compared with the amount required for completely burning unburned ingredients such as HC and CO in the exhaust gas, it is difficult to remove NOx through reduction by using a normal three way catalytic converter.

Moreover, in the case of Diesel engines whose exhaust gas forms an oxidizing atmosphere, a method is known in which a reducing agent, such as ammonia, hydrogen or carbon monoxide, is used to remove NOx from exhaust gas from a Diesel engine that forms a stationary source of generation, such as a boiler.

In this method, however, an additional device for adding the reducing agent and a special device for recovering and treating the unreacted reducing agent are needed; this makes the entire equipment more complex and bulky, and the resulting problem is that this method is not applicable to engines that form a movable source of generation such as cars.

In order to solve the above-mentioned problems, various catalysts have been proposed for removing NOx in an oxidizing atmosphere.

However, no conventional methods have successfully provided an NOx removing catalyst which can decompose and remove NOx in exhaust gas effectively even in an oxidizing atmosphere, which is superior in heat resistance and durability under high temperatures, and which can exert a catalytic activity in a wide temperature range.

As some of those NOx removing catalysts, for example, aluminosilicate with exchanged transition-metal ions, such as copper ions, (see Japanese Laid-Open Patent Publication No. 125250/1985 (Tokukaisho 60-125250), Japanese Laid-Open Patent Publication No. 100919/1988 (Tokukaisho 63-100919) and the specification of the U.S. Pat. No. 4,297,328) or metallo-aluminosilicate (see Japanese Laid-Open Patent Publications No. 127628/1991 (Tokukaihei 3-127628) and No. 229620/1991 (Tokukaihei 3-229620)), and silico-aluminophosphate (see Japanese Laid-Open Patent Bublication No. 293049/1990 (Tokukaihei 2-293049) have been proposed.

However, these so-called ion-exchange zeolite catalysts require high temperatures to remove NOx and consequently have reduced effects at low temperatures, and are inferior in heat resistance to the point that their NOx decomposing capability is extremely reduced when exposed to high-temperature exhaust gas; accordingly, these catalysts have not been successfully put into practical use.

Moreover, as an NOx removing catalyst for use in an oxidizing atmosphere, a catalyst having iridium deposited on a fire-resisting inorganic oxide such as alumina has been disclosed (see Japanese Examined Patent Publications No. 54173/1981 (Tokukousho 56-54173) and No. 13328/1982 (Tokukousho 57-13328)). However, in the embodiments described in these patent publications, only examples using the oxygen concentration in exhaust gas not more than 3 volume % are shown, and no consideration was given to NOx purifying capability and heat resistance with respect to exhaust gas from diesel engines and lean-burn engines that contains oxygen not less than the above-mentioned amount.

Furthermore, catalysts having iridium deposited on a support such as zeolite and crystalline silicate have been proposed (see Japanese Laid-Open Patent Publications No. 296870/1994 (Tokukaihei 6-296870), No. 80315/1995 (Tokukaihei 7-80315) and No. 88378/1994 (Tokukaihei 7-88378)). However, with respect to conditions of the durability tests for these catalysts, those tests were merely carried out in an reducing atmosphere of exhaust gas, and no consideration was given to durability and heat resistance in an oxidizing atmosphere such as exhaust gas from diesel engines, lean-burn engines and gasoline engines of the fuel-direct-injection type.

Moreover, catalysts having iridium deposited on a support made of a material such as a metallic carbide and a metallic nitride have been proposed (see Japanese Laid-Open Patent Publications No. 31173/1994 (Tokukaihei 6-31173), No. 31884/1995 (Tokukaihei 7-31884), No. 246337/1995 (Tokukaihei 7-246337, No. 33845/1996 (Tokukaihei 8-33845) and No. 71422/1996 (Tokukaihei 8-71422).

However, the examples of the above-mentioned Patent Publications merely show maximum NOx removing rates, and with respect to temperature ranges at which the maximum NOx removing rates are exerted, nothing is clarified except for the case in which light-off characteristics are shown. The light-off characteristic shows the exhaust-gas-purifying characteristic at various exhaust gas temperatures.

Judging from the example having the light-off characteristic, it is the temperature range exceeding 350° C. that the activity for removing NOx appears, and the NOx purifying activity is extremely reduced in the temperature range not more than 350° C.

In addition, another disadvantage of these conventional catalysts is that after having been used for a long time, the temperature at which the NOx purifying activity rises is greatly shifted toward the high-temperature side. Further, since metallic carbides and metallic nitrides are expensive, the cost increases. Consequently, the catalysts, described in the above-mentioned Patent Publications, have merely narrow temperature ranges in the activity for removing NOx, and also have high costs.

Consequently, at present, no conventional methods have successfully provided an NOx removing catalyst which can decompose and remove NOx in exhaust gas effectively even in an oxidizing atmosphere, which is superior in heat resistance and durability under high temperatures, and which can exert a catalytic activity in a wide temperature range at low costs.

Moreover, with respect to car engines, there is a tendency to set the temperature of exhaust gas at a low level with a view to achieving a more efficient combustion and a lower fuel consumption; therefore, there is an increasing demand for a method for reducing HC, CO and NOx from exhaust gas even at lower exhaust gas temperatures.

Furthermore, Laid-Open International Patent Publication No. WO 93/08383 discloses a catalyst which oxidizes and adsorbs NOx in an oxidizing atmosphere, while discharging NOx in a reducing atmosphere, and an exhaust-gas-purifying method using such a catalyst.

In this method, however, sulphur oxides, contained in exhaust gas, are irreversibly adsorbed simultaneously with NOx, and the resulting disadvantage is that the NOx purifying capability deteriorates with time due to the adsorption.

Consequently, at present, the above-mentioned conventional methods have failed to successfully provide an exhaust-gas-purifying catalyst which can decompose NOx efficiently and remove it from exhaust gas even in an oxidizing atmosphere, which is superior in heat resistance under high temperatures, which can avoid degradation in performance due to poisoning from sulphur oxides, etc., and which exerts a catalyst activity for reducing HC, CO and NOx in exhaust gas in a wide temperature range, especially, in a low temperature range, and an exhaust-gas-purifying method using such a catalyst.

The objective of the present invention is to provide an exhaust-gas-purifying catalyst which is superior in oxidizing activity for HC and CO, reduces NOx efficiently not only in a reducing atmosphere but also in an oxidizing atmosphere, has high heat resistance and high durability, and also exhibits its activity in a wider range, and a purifying method for exhaust gas.

Moreover, a catalyst on which a complex oxide of iridium is deposited together with noble metals such as platinum, rhodium and palladium has been proposed (see Japanese Laid-Open Patent Publication No. 277369/1993 (Tokukaihei 5-277369). Although this method can improve heat resistance of a catalyst, its NOx removing capability is low in high-temperature ranges, as compared with the other temperature ranges.

As described above, at present, it has not been successful to develop any catalyst which decomposes and removes NOx from exhaust gas efficiently even in an oxidizing atmosphere, is superior in heat resistance and durability at high temperatures, and exhibits a catalytic activity in a wide temperature range at low costs.

Moreover, in each of the embodiments of the above-mentioned Patent Publications, although the maximum NOx removing rate obtained by the use of the corresponding catalyst is listed, the exhaust gas temperature at which the maximum NOx removing rate was obtained is not given. Furthermore, with respect to the catalyst whose light-off characteristic is shown.

The present invention has been devised to solve the above-mentioned conventional problems, and its objective is to provide an exhaust-gas-purifying catalyst which removes NOx efficiently not only in a reducing atmosphere but also in an oxidizing atmosphere, exhibits an NOx-removing activity in a wide temperature range, is superior in heat resistance and durability, and can suppress the temperature range at which the NOx-purifying performance is exerted from shifting toward the high-temperature side, and also to provide a process for purifying exhaust gas.

DISCLOSURE OF THE INVENTION

The inventors and other personnel of the present invention, who had earnestly made research efforts to solve the above-mentioned problems, found that a catalyst containing iridium and sulphur is effective to solve the above-mentioned problems, and consequently completed the present invention.

More specifically, an NOx-removing catalyst, which is an exhaust-gas-purifying catalyst of the present invention, is characterized in that it contains iridium and sulphur in order to solve the above-mentioned problems. The iridium is preferably deposited on a support containing sulphur. Further, the sulphur is preferably prepared as a sulfate.

This NOx-removing catalyst makes it possible to remove NOx even in an oxidizing atmosphere since it contains iridium as a catalyst-activating material, and further makes it possible to improve the catalyst activity of the iridium by the sulphur contained therein; thus, it is allowed to exhibit the activity for removing NOx in an oxidizing atmosphere in a wide temperature range and also to have high heat resistance and high durability.

In the present specification, even materials such as sulphur, which, if used alone, do not have an activity for removing NOx but which improve the catalyst activity of iridium having the corresponding activity, are also referred to as catalyst active materials.

The following description will discuss one embodiment regarding the NOx-removing catalyst of the present invention.

The NOx-removing catalyst contains iridium as a catalyst active material for removing NOx, the iridium is deposited onto a support containing sulphur, and the sulphur is contained as a sulfate.

With respect to the above-mentioned support, the following materials are listed: a support compound containing a sulfate, such as aluminum having a sulfate having sulfur deposited thereon or barium sulfate having sulphur, which is used alone, or a mixture between the above-mentioned support compound and a fire resistant inorganic oxide normally used as a support having a catalyst deposited thereon, such as, for example, α-alumina, or active alumina of γ, δ, η, or θ or titania, a mixture (including mixed sintered body) between a complex oxide of the above-mentioned fire-resistant inorganic oxide and the above-mentioned support compound, and a mixture between the above-mentioned support compound and an element selected from the group of aluminum phosphate, crystalline aluminosilicate and silico-aluminophosphate.

The content of iridium is preferably set in the range of 0.5 to 10% by weight with respect to the support having the iridium as its catalyst ingredient. If the content is less than 0.5% by weight, the NOx-removing efficiency is reduced, and if the amount of load exceeds 10% by weight, it is not possible to obtain the catalyst activity corresponding to the amount of load. With respect to the source of iridium, water-soluble iridium salts, such as iridium chloride and trichlorohexaamineiridium, are preferably used, although it is not particularly limited thereby.

The method for depositing iridium onto the support is not particularly limited, and normal depositing methods are used. For example, (1) the support is impregnated with an aqueous solution of iridium salt, and then dried and calcined, (2) the support is put into an aqueous solution of iridium salt and mixed, and then reduced by using a reducing agent such as hydrazine so as to allow deposition.

The rate of deposition between sulfur and iridium is preferably set in the range of 1:5 to 50:1 at weight ratio. If the rate of deposition of sulphur is greater than the rate 50:1, the initial activity is reduced, while if is smaller than the rate 1:5, the active temperature range is narrowed.

With respect to the source of sulfur, for example, sulfuric acid, sulfates, sulfites, sulfides, etc. are used, although it is not limited thereby. With respect to methods for adding sulfur, the following methods are listed: (1) After adding sulfuric acid to the support, it is dried and calcined. (2) Among sulfates, sulfites, etc., an organic-solvent soluble and/or water-soluble sulfur-containing compound is selected to prepare an aqueous solution of the sulfur-containing compound, and with this is a support impregnated, and dried and calcined. (3) Among sulfates, sulfides, etc., an insoluble or slightly-soluble compound is used as a support for iridium. (4) Among sulfates, sulfides, etc., an insoluble or slightly-soluble compound and a support having iridium deposited thereon are used in a mixed manner.

Specific modes in which the above-mentioned exhaust-gas-purifying catalyst is normally used are described as follows: (1) The catalyst itself is formed into a predetermined shape, for example, a globular shape or a column shape. (2) The catalyst ingredient is applied to and deposited on a substrate called a three-dimensional structural body. With respect to the three-dimensional structural body, for example, a honeycomb monolith substrate, a foamed substrate and a corrugated substrate are listed, and with respect to its material, those made of ceramics or metals are preferably used.

The following description will discuss methods for preparing the exhaust-gas-purifying catalyst.

(1) In the case when the catalyst composition itself serves as the catalyst, the following methods are, for example, listed:

(a) After the catalyst composition has been mixed sufficiently, it is formed into a column shape, a globular shape, etc. and used as the catalyst.

(b) After the support having the catalyst deposited thereon has been formed into a predetermined shape, for example, a globular shape or a column shape, it is coated with the catalyst composition.

(2) In the case when a monolithic structural body or an inactive inorganic substrate (hereinafter, referred to as a monolithic structural body, etc.) is used, the following examples are listed:

(a) The catalyst composition is put into a ball mill or other machine in one lot, and is wet ground to prepare a slurry, and the monolithic structural body, etc. is dipped therein, and then dried and calcined.

(b) The support having the catalyst deposited thereon is wet ground by a ball mill or other machine to prepare a slurry, and the monolithic structural body, etc. is dipped therein, and then dried and calcined. Next, the monolithic structural body, etc. coated with the support having the catalyst deposited thereon is dipped into an aqueous solution containing iridium, and then dried and calcined, and the resulting monolithic structural body, etc. is further dipped into a solution containing sulfur, and dried and calcined.

(c) Iridium is preliminarily deposited on the support, and this is formed into a slurry by using a ball mill or other machine, and the monolithic structural body, etc. is dipped therein to obtain the monolithic structural body, etc. coated with the support having iridium deposited thereon. Then, this is dipped into a solution containing sulfur, and dried and calcined.

(d) The support is impregnated with a solution containing sulfur, and calcined, and the resulting powder is formed into a slurry by using a ball mill or other machine, and the monolithic structural body, etc. is dipped into the slurry so that the monolithic structural body, etc. coated with the support having sulfur deposited thereon is obtained. Then, this is dipped into an aqueous solution containing iridium, and dried and calcined.

(e) After preliminarily depositing iridium and sulfur on the support, this is formed into an aqueous slurry by using a ball mill or other machine, and the monolithic structural body, etc. is dipped into the aqueous slurry, and dried and calcined.

(f) After depositing iridium onto the support containing sulfur, this is formed into an aqueous slurry by using a ball mill or other machine, and the monolithic structural body, etc. is dipped into the aqueous slurry, and dried and calcined.

(g) After preliminarily depositing iridium on the support, this is mixed with a compound containing sulfur, and formed into an aqueous slurry by using a ball mill or other machine, and the monolithic structural body, etc. is dipped into the aqueous slurry, and dried and calcined. Among the above-mentioned methods, the methods (2) (a) through (g) are preferably applied.

Moreover, when the monolithic structural body, etc. is coated with the catalyst ingredient, the amount of coat of the catalyst ingredient is preferably set in the range of 50 to 400 g per liter of the monolithic structural body, etc. If the amount is less than 50 g, the catalyst activity is reduced, and if it exceeds 400 g, it is not possible to obtain the catalyst activity corresponding to the amount of load.

Next, the following description will discuss another exhaust-gas-purifying catalyst of the present invention. The inventors and concerned personnel of the present invention made further research in order to achieve the aforementioned objective, which is to provide, first, an exhaust-gas-purifying catalyst which is superior in oxidizing activity for HC and CO, reduces NOx efficiently not only in a reducing atmosphere but also in an oxidizing atmosphere, has high heat resistance and high durability, and also exhibits its activity in a wider range, and, second, a purifying method for exhaust gas. As a result, the inventors and concerned personnel found that a catalyst, which has a fire-resistant inorganic compound having at least one element selected from the group consisting of platinum, palladium and rhodium deposited thereon and a metallic sulfate that is a compound containing sulfur having iridium deposited thereon, can be effectively used to achieve the above-mentioned objective, and completed the present invention.

In other words, the above-mentioned exhaust-gas-purifying catalyst is characterized in that it has a fire-resistant inorganic compound having at least one element selected from the group consisting of platinum, palladium and rhodium deposited thereon and a metallic sulfate having iridium deposited thereon.

The above-mentioned composition makes it possible to provide a function for purifying exhaust gas by reducing HC and CO through oxidation and for reducing NOx from the exhaust gas in a reducing atmosphere, and even in an oxidizing atmosphere, within a comparatively low temperature range due to the behavior of at least one element selected from the group consisting of platinum, palladium and rhodium; furthermore, this composition also provides a function for reducing NOx from exhaust gas under the coexistence of HC within a comparatively high-temperature range in an oxidizing atmosphere, while suppressing reduction in the catalyst activity resulted from sulfur oxides, etc. contained in the exhaust gas, due to the behavior of iridium deposited on the metallic sulfate.

The exhaust-gas-purifying catalyst may be arranged so that, of the catalyst ingredients of the exhaust-gas-purifying catalyst, the fire-resistant inorganic compound having at least one element selected from the group consisting of platinum, palladium and rhodium deposited thereon is placed as a lower layer and on this layer is formed the metallic sulfate having iridium deposited thereon in a manner so as to face the exhaust gas flow. Additionally, any number of the layers may be used as long as it is not less than two, and the number may be preferably changed depending on how the catalyst is prepared.

With this arrangement, since the respective catalyst ingredients are placed on the upper layer and the lower layer, the catalyst ingredients are separated from each other; thus, it becomes possible to prevent the exhaust-gas-purifying function for reducing NOx in the presence of HC, which is possessed by the metallic sulfate having iridium deposited thereon that forms the upper layer, and HC oxidizing reaction, which is possessed by the fire-resistant inorganic compound having the above-mentioned element deposited thereon that forms the lower layer, from conflicting with each other.

For this reason, the above-mentioned arrangement prevents both of the purifying functions from being reduced by the conflict, thereby making it possible to provide an exhaust-gas-purifying catalyst which exhibits the respective purifying functions to a maximum extent.

The exhaust-gas-purifying catalyst may be arranged so that with respect to the catalyst composition of the exhaust-gas-purifying catalyst, the metallic sulfate having iridium deposited thereon is placed on the front side and the fire-resistant inorganic compound having at least one element selected from the group consisting of platinum, palladium and rhodium (hereinafter, referred to as platinum or the like element) deposited thereon is placed on the rear side, in relation to the exhaust gas.

Further, with respect to the arrangement of the exhaust-gas-purifying catalyst, the exhaust-gas-purifying catalyst may be divided into a plurality of pieces, and in relation to the exhaust gas flow, those containing the metallic sulfate having iridium deposited thereon are placed as pieces at the front stages, and those containing the fire-resistant inorganic compound having platinum or the like element deposited thereon are placed as pieces at the rear stages.

With the above-mentioned arrangements, since the metallic sulfate and the fire-resistant inorganic compound are separated from each other, it is possible to prevent both of the purifying functions provided by platinum or the like element from being reduced by the aforementioned conflict, thereby making it possible to provide an exhaust-gas purifying catalyst which exhibits the respective purifying functions to a maximum extent.

With respect to the pieces at the front stages, for example, any of the following catalysts may be used: only the metallic sulfate having iridium deposited thereon, or catalyst to which other ingredients, such as an activation assistant and a formation assistant, are added and which is formed into a specific shape, or catalyst which is made by depositing a compound containing the metallic sulfate having iridium deposited thereon onto a substrate such as a three-dimensional structural body.

With respect to the pieces at the rear stages, for example, any of the following catalysts may be used: only the fire-resistant inorganic compound having at least one element selected from the group consisting of platinum, palladium and rhodium deposited thereon, or catalyst to which other ingredients, such as an activation assistant and a formation assistant, are added and which is formed into a specific shape, or catalyst which is made by depositing a compound containing the fire-resistant inorganic compound onto a substrate such as a three-dimensional structural body.

Moreover, with respect to the metallic sulfate on which iridium is deposited, it is preferable to use a sulfate of an alkaline earth metal. The use of a sulfate of an alkaline earth metal further improves the purifying function of iridium for reducing NOx, and allows it to exhibit the catalyst activity in a wider temperature range of the exhaust gas.

It is more preferably to further deposit onto the metallic sulfate having iridium deposited thereon a compound of at least one element selected from the group consisting of tin, gallium, germanium and silicon; thus, it becomes possible to obtain a higher NOx purifying activity.

In the case when a catalyst is used for reducing HC, CO and NOx in exhaust gas from internal combustion engines, the application of the above-mentioned exhaust-gas-purifying catalyst makes it possible to set the exhaust-gas temperature at the catalyst inlet on the catalyst bed using the above-mentioned exhaust-gas-purifying catalyst in a wider temperature range including a lower temperature region, such as in the range of 200 to 700° C.

The following description will discuss one embodiment of the above-mentioned exhaust-gas-purifying catalyst.

The exhaust-gas-purifying catalyst contains a fire-resistant inorganic compound having platinum or the like element deposited thereon and a metallic sulfate having iridium deposited thereon as catalyst-activating materials for removing NOx.

With respect to the fire-resistant inorganic compound, the aforementioned supports can be used. Further, in order to improve the heat stability of these fire-resistant inorganic oxides, rare-earth metals such as lanthanum, cerium and yttrium, and alkaline earth metals, such as magnesium, calcium, barium, and oxides of these elements may be added to the fire-resistant inorganic compound.

The content of platinum of the like element is preferably set in the range of 0.1 to 20% by weight with respect to the support having the catalyst deposited thereon. If the content is less than 0.1% by weight, the removing efficiency of HC, CO and NOx is reduced, and even if the amount of load exceeds 20% by weight, it is not possible to obtain the activity corresponding to the amount. With respect to the source of platinum or the like element, for example, a water-soluble salt of chloroplatinic acid, rhodium nitrate, palladium nitrate, etc. is preferably used, although it is not limited thereby.

The method for depositing platinum or the like element onto the fire-resistant inorganic compound is not particularly limited, and normal depositing methods are used. For example, (1) the support is impregnated with an aqueous solution of salt of platinum or the like element, and then dried and calcined, or (2) the aqueous solution of salt of platinum or the like element is mixed with the fire-resistant inorganic compound, and then this is reduced by using a reducing agent such as hydrazine so as to allow deposition of platinum or the like element onto the fire-resistant inorganic compound.

With respect to metallic sulfates on which iridium is deposited, sulfates of alkaline earth metals, such as magnesium sulfate, calcium sulfate, strontium sulfate and barium sulfate, sulfates of light metals, such as titanyl sulfate, zirconium sulfate and aluminum sulfate, and sulfates of transition metals, such as manganese sulfate, cobalt sulfate and iron sulfate, may be used. Among these, sulfates of alkaline earth metals are more preferably adopted, and barium sulfate is most preferably adopted.

The content of iridium is preferably set in the range of 0.1 to 20%. by weight with respect to the metallic sulfate on which iridium is deposited. If the content is less than 0.1% by weight, the removing efficiency of NOx is reduced, and even if the amount of deposition exceeds 20% by weight, it is not possible to obtain the catalyst activity corresponding to the amount of deposition. The source of iridium is not particularly limited; for example, an water-soluble salt of iridium, such as iridium chloride and trichlorohexaamineiridium, is preferably used.

The method for depositing iridium onto the metallic sulfates is not particularly limited, and normal depositing methods are used. For example, (1) the aqueous solution of salt of iridium is impregnated with the metallic sulfate, and then dried and calcined, or (2) the aqueous solution of salt of iridium is mixed with the metallic sulfate, and then reduced by using a reducing agent such as hydrazine so as to allow deposition of the reduced iridium onto the metallic sulfate.

In the above-mentioned exhaust-gas-purifying catalyst, it is more preferably to further deposit onto the metallic sulfate a compound of at least one element selected from the group consisting of tin, gallium, germanium and silicon. This compound is not particularly limited; for example, oxides of the above-mentioned elements are preferably used. Further, after adding the above-mentioned elements as the chlorides, etc. thereof, the elements may be formed into oxides through calcination.

The amount of addition of the element to the metallic sulfate is preferably set in the range of 0.01 to 10 times in the weight ratio to iridium. If the ratio is less than 0.01 times, no effect of the addition appears, and even if the deposition exceeds 10 times, it is not possible to obtain the catalyst activity corresponding to the amount of deposition.

The method for depositing the element onto the metallic sulfate is not particularly limited, and normal depositing methods are used; for example, (1) the element may be mixed with the metallic sulfate having iridium deposited, (2) the element and iridium may be deposited on the metallic sulfate at the same time, (3) iridium may be deposited on the mixture of an oxide of the element and the metallic sulfate, or (4) a solution of a soluble compound of the element is allowed to penetrate the metallic sulfate having iridium deposited thereon, and this is dried and calcined. Here, specific modes in the application of the above-mentioned catalyst are the same as those described earlier.

Moreover, in the case when the monolithic structural body, etc. is coated with the catalyst ingredients, the amounts of coat of the catalyst ingredients, that is, the amount of coat of the fire-resistant inorganic compound having platinum or the like element deposited thereon and that of the metallic sulfate having iridium deposited thereon, are preferably set in the range of 10 to 400 g per one liter of the monolithic structural body, etc. If the amount is less than 10 g, the catalyst activity is reduced, and even if the amount exceeds 400 g, it is not possible to obtain the activity corresponding to the amount of deposition.

The following description will discuss another exhaust-gas-purifying catalyst of the present invention.

The inventors and concerned personnel of the present invention made further research in order to achieve the aforementioned objective that is to provide an inexpensive NOx-removing catalyst which efficiently decomposes and removes NOx from exhaust gas even in an oxidizing atmosphere, has high heat resistance and high durability even in high temperature ranges, and also exhibits its activity in a wider range. As a result, the inventors and concerned personnel found that a catalyst which contains iridium and sulfur as well as at least one element selected from the group consisting of calcium, strontium and barium is effectively used to achieve the above-mentioned objective, and completed the present invention.

In other words, the NOx-removing catalyst, which is another exhaust-gas-purifying catalyst of the present invention, is characterized in that it contains iridium and sulfur as well as at least one element selected from the group consisting of calcium, strontium and barium as catalyst active substances respectively.

In the present invention, the catalyst activity of iridium for removing NOx can be improved in a wider temperature range by allowing sulfur to coexist with the NOx-removing catalyst containing iridium. Further, since iridium and sulfur coexist with the element selected from the above-mentioned group, the dispersion of iridium, which tends to occur at high temperatures, can be suppressed, and consequently, the heat resistance and durability of the catalyst, especially those at high temperatures, can be improved.

The iridium and the element are preferably formed into a complex oxide. Further, this complex oxide of iridium is preferably deposited on the support containing sulfur. Further, the sulphur is preferably prepared as a sulfate.

The arrangement in which the iridium and the element are preferably formed into a complex oxide further prevents the dispersion of iridium, thereby improving the catalyst activity, as well as improving the heat resistance and durability. Moreover, since the complex oxide of iridium is deposited on the support containing sulfur, the catalyst is allowed to exhibit the catalyst activity in a wider temperature range, and also has superior durability in a wider temperature range.

Moreover, since the sulfur is contained in the form of a sulfate, the sulfur is more stably deposited so that the catalyst activity is stabilized in a superior manner and the durability is further improved. In addition, different from conventional compositions, the NOx-removing catalyst makes it possible to avoid the use of expensive materials such as metallic carbides such as silicon carbide (SiC) and metallic nitrides (SiN) such as silicon nitride; thus, it is possible to reduce costs.

The following description will discuss one embodiment of the above-mentioned exhaust-gas-purifying catalyst.

The NOx-removing catalyst contains iridium and sulfur as catalyst active substances for removing NOx. The iridium is used as a complex oxide that is formed with at least one element selected from the group consisting of calcium, strontium and barium. Further, the sulfur, in the form of a sulfate, is contained in the support having the catalyst active substances deposited on the surface thereof. The complex oxide of iridium is deposited on the support containing the sulfur.

With respect to the support, a fire-resistant inorganic compound having the sulfate deposited thereon, or a compound containing sulfur in a form such as a sulfate like barium sulfate, a sulfite and a sulfide, can be used alone. With respect to the fire-resistant inorganic compound, those materials as described earlier can be used.

Moreover, the support can be used in the form of a mixture of a support compound containing sulfur and another compound. With respect to the mixture, a mixture of the fire-resistant inorganic compound and the support compound may be used. The support may be provided as a mixed sintered material that is made by mixing the fire-resistant inorganic compound and the support compound and then calcining it.

The content of iridium to be deposited is preferably set in the range of 0.1 to 20% by weight, and is more preferably set in the range of 0.5 to 10% by weight. If the content of iridium is less than 0.1% by weight, the removing rate of NOx is reduced. In contrast, even if the content of iridium exceeds 20% by weight, it is not possible to obtain the catalyst activity corresponding to the amount of deposition.

Moreover, the above-mentioned composition may contain the aforementioned fire-resistant inorganic compound. The fire-resistant inorganic compound may be provided as a composite state with another catalyst ingredient. By allowing the fire-resistant inorganic oxide to be contained in the catalyst, the catalyst strength can be improved.

The source of iridium is not particularly limited; for example, a water-soluble salt of iridium, such as iridium chloride and trichlorohexaamineiridium, is preferably adopted. With respect to the complex oxide of iridium, $CaIrO_3$, $SrIrO_3$, $BaIrO_3$, $Ba_2IrO_4$, $Ba_3IrO_5$, $Ba_4IrO_6$, $Sr_3Ir_2O_7$, and $Sr_2Ir_3O_8$ are, for example, listed.

The materials of calcium, strontium and barium are not particularly limited; for example, nitrates, acetates, chlorides, sulfates, oxides, peroxides, hydroxides, etc. are used.

The ratio of deposition between iridium and at least one element (referred to as an ingredient H) selected from the group consisting of calcium, strontium and barium is preferably set in the range of 1:5 to 200:1 in the molar ratio. If the ratio of deposition of ingredient H is greater than 200:1, the removing rate of NOx is reduced. In contrast, if the ratio of deposition of ingredient H is smaller than 1:5, the heat resistance and durability are reduced in high temperature ranges.

The method for depositing the complex oxide of iridium onto the support is not particularly limited, and the aforementioned normal depositing methods are used. The ratio of deposition between sulfur and iridium is preferably set in the range of 1:5 to 50:1 in the weight ratio. If the ratio of deposition of sulfur is greater than 50:1, the initial catalyst activity is reduced, and in contrast, if the ratio of deposition of sulfur is smaller than 1:5, the effective temperature range of the catalyst activity is narrowed.

The source of sulfur is not particularly limited; for example, the aforementioned sulfuric acid, sulfates, sulfites and sulfides are used. With respect to the method for adding sulfur, the following methods are listed: (1) sulfur is added to the fire-resistant inorganic compound, and this is dried and calcined. (2) Among the sulfates and sulfites, an organic-solvent soluble and/or water-soluble sulfur-containing compound is used and the fire-resistant inorganic compound is dipped into a solution of the sulfur-containing compound, and dried and calcined. (3) Among sulfates, sulfides, etc., an insoluble or slightly-soluble compound is used as a support for iridium. (4) Among sulfates, sulfides, etc., an insoluble or slightly-soluble compound and a support having iridium deposited thereon are used in a mixed manner.

Specific modes in the application of the above-mentioned catalyst are the same as those described earlier, and in the case when the monolithic structural body, etc. is coated with the catalyst ingredient, the amount of coat of the catalyst ingredient is set in the same manner as described earlier.

Next, the following description will discuss still another exhaust-gas-purifying catalyst of the present invention.

The inventors and concerned personnel of the present invention made further research in order to achieve the aforementioned objective that is to provide an exhaust-gas-purifying catalyst, as well as an exhaust-gas-purifying method, which efficiently removes NOx from exhaust gas not only in a reducing atmosphere but also in an oxidizing atmosphere, which exhibits the NOx-removing activity in a wider temperature range with superior heat resistance and durability, and which can suppress the temperature range at which the NOx-purifying performance is exerted from shifting toward the high-temperature side. As a result, the inventors and concerned personnel found that a catalyst which contains iridium, a rear-earth metal and sulfur is effectively used to achieve the above-mentioned objective, and completed the present invention. In other words, the above-mentioned exhaust-gas-purifying catalyst is characterized in that it contains iridium, a rare-earth metal and sulfur.

The above-mentioned composition makes it possible to exert a function for efficiently purifying NOx even in the coexistence of HC in an oxidizing atmosphere by utilizing the interaction between iridium and sulfur. Further, the coexistence of the rare-earth metal allows high performance even for a long-time use under practical service conditions, and suppresses the temperature range at which the NOx-purifying performance is exerted from shifting toward the high-temperature side. Thus, it becomes possible to use the catalyst for a long time without changing reaction conditions.

Moreover, as compared with conventional catalysts that use a metallic carbide or a metallic nitride having iridium deposited thereon, the above-mentioned exhaust-gas-purifying catalyst only needs to use an inexpensive metallic sulfate, etc. so as to allow deposition of sulfur instead of using an expensive metallic carbide or metallic nitride. Therefore, it is possible to reduce costs as compared with the conventional catalysts.

In the above-mentioned exhaust-gas-purifying catalyst, sulfur is preferably contained therein as a metallic sulfate, and sulfur is more preferably contained as a sulfate of an alkaline earth metal. With this composition, the function of iridium for purifying NOx is accelerated so that the activity is exerted in a wider temperature range.

Moreover, in the above-mentioned exhaust-gas-purifying catalyst, the rare-earth element is preferably contained therein as an oxide containing at least one element selected from the group consisting of cerium (Ce), lanthanum (La), yttrium (Y), neodymium (Nd) and praseodymium (Pr).

Furthermore, in the above-mentioned exhaust-gas-purifying catalyst, the rare-earth element is more preferably contained therein as a complex oxide containing at least one element selected from the group consisting of cerium, lanthanum, yttrium, neodymium and praseodymium and at least one element selected from the group consisting of manganese, iron, cobalt, nickel, copper and zinc. With this composition, the above-mentioned catalyst further suppresses the temperature range at which the NOx-purifying performance is exerted from shifting toward the high-temperature side in time.

Furthermore, it is preferable for the above-mentioned exhaust-gas-purifying catalyst to contain a compound of at least one element selected from the group consisting of tin, gallium, germanium and silicon. This composition makes it possible to further improve the NOx-purifying performance. In addition, it is more preferable for the above-mentioned exhaust-gas-purifying catalyst to contain the aforementioned fire-resistant inorganic compound. Thus, it becomes possible to further improve the strength thereof.

The following description will discuss one embodiment of the above-mentioned catalyst.

The exhaust-gas-purifying catalyst contains iridium, rare-earth elements and sulfur. Here, in the present specification, "rare-earth elements" refer to scandium (Sc), yttrium and lanthanoid.

Moreover, in addition to iridium, rare-earth elements and sulfur, the exhaust-gas-purifying catalyst may further contain a fire-resistant inorganic compound, if necessary. With respect to the fire-resistant inorganic compound, the aforementioned fire-resistant inorganic oxides may be used. The fire-resistant inorganic compound may exist in a combined state with the rare-earth element, that is, for example, as a complex oxide, etc. with the rare-earth element.

With respect to the above-mentioned sulfur, for example, sulfuric acid, sulfates, sulfites, sulfides, etc. are used, and it is more preferably for the sulfur to be contained in a compound having a sulfate. With respect to the compound containing a sulfate, more specifically, alumina having a sulfate deposited thereon, metallic sulfates and a mixture (including mixed sintered body) of a metallic sulfate and a catalyst support or a loaded form thereof are used.

With respect to the metallic sulfates, the aforementioned sulfates of alkali-earth metals, the aforementioned sulfates of light metals, or the aforementioned sulfates of transition metals may be used. Among these, the sulfates of alkali-earth metals are preferably adopted, and barium sulfate is more preferably adopted.

Moreover, with respect to the catalyst-carrying base material that is used as a support for the metallic sulfate, any fire-resistant inorganic compound is used, and the aforementioned fire-resistant inorganic oxides, which are commonly used as supports on which catalyst is deposited, may be used.

In the case of deposition of the metallic sulfate, the methods for depositing the metallic sulfate onto the catalyst-carrying base material are, for example, listed as follows: (1) Sulfuric acid is added to the catalyst-carrying base material, and dried and calcined. (2) The catalyst-carrying base material is dipped into an aqueous solution of an organic-solvent soluble and/or water-soluble metallic sulfate, and dried and calcined.

Here, in the case of a metallic sulfate (for example, barium sulfate, etc.) that is insoluble to water, it is preferably used in a mixed form with the fire-resistant inorganic compound, or it is preferably used alone in combination with other ingredients (that is, without using the fire-resistant inorganic compound).

The content of iridium is preferably set in the range of 0.1 to 20% by weight with respect to the support having the iridium as its catalyst ingredient, and is more preferably set in the range of 0.5 to 10% by weight. If the content is less than 0.1% by weight, the NOx-removing efficiency is reduced, and if the amount of load exceeds 20% by weight, it is not possible to obtain the catalyst activity corresponding to the amount of load. With respect to the source of iridium, water-soluble iridium salts, such as iridium chloride and trichlorohexaamineiridium, are preferably used, although it is not particularly limited thereby.

The rate of deposition between sulfur and iridium is preferably set in the range of 1:5 to 50:1 at weight ratio. If the rate of deposition of sulphur is greater than the rate 50:1, the initial activity is reduced, while it is smaller than the rate 1:5, the active temperature range is narrowed.

The state of existence of iridium in the exhaust-gas-purifying catalyst is not particularly limited, as long as it coexists with sulfur; however, it is more preferable for iridium to be deposited on a sulfur-containing compound. A compound having a sulfate is preferably used as the sulfur-containing compound.

Moreover, iridium may be deposited on the catalyst-carrying base material together with the sulfur-containing compound. The method for depositing iridium onto the sulfur-containing compound is not particularly limited, and the aforementioned depositing methods are used.

Additionally, with respect to the methods for depositing iridium onto the catalyst-carrying base material together with the sulfur-containing compound, the following methods are, for example, listed: An insoluble or slightly-soluble sulfur-containing compound, such as a sulfate and a sulfide, is used, and the catalyst-carrying base material is dipped into the solution of the sulfur-containing compound, and then, dried and calcined. The insoluble or slightly-soluble sulfur-containing compound, such as a sulfate and a sulfide, is mixed with the catalyst-carrying base material having iridium deposited thereon, and applied.

The above-mentioned rare-earth element is preferably contained as an oxide (hereinafter, referred to as a rare-earth oxide) containing at least one element selected from the group consisting of cerium, lanthanum, yttrium, neodymium and praseodymium, and is more preferably contained as a complex oxide containing these elements.

The above-mentioned rare-earth element is most preferably contained as a complex oxide containing at least two elements selected from the group consisting of cerium, lanthanum, yttrium, neodymium and praseodymium.

Moreover, the above-mentioned rare-earth element is most preferably contained as a complex oxide containing at least one element selected from the group consisting of cerium, lanthanum, yttrium, neodymium and praseodymium as well as at least one element selected from the group consisting of titanium, manganese, iron, cobalt, nickel, copper and tin. In this complex oxide, the weight ratio between at least one element selected from the group consisting of cerium, lanthanum, yttrium, neodymium and praseodymium and at least one element selected from the group consisting of titanium, manganese, iron, cobalt, nickel, copper and tin is preferably set in the range of 1:20 to 100:1.

The methods for obtaining these complex oxides are, for example, listed as follows:

h) Oxides of the respective elements, or precursors of these oxides, such as nitrates, acetates, chlorides, sulfates, oxalates, etc. of the respective elements, are mixed, and then, calcined.

i) An oxide of a specific element is impregnated with a solution of soluble salts of other elements, for example, nitrates, acetates, chlorides, sulfates, oxalates, etc. of other elements, and this is dried and calcined.

j) After having mixed solutions containing precursors of the respective ingredients, such as oxides, nitrates, acetates, chlorides, sulfates and oxalates, a process is carried out so as to produce coprecipitate or mixed sol and gel, and the resulting coprecipitate or mixed sol and gel is recovered, and then dried and calcined. Among these methods, i) and h) are preferably adopted.

The amount of addition of the rare-earth elements, in conversion to oxides, is preferably set in the range of 0.1 g to 500 g with respect to 1 g of iridium. If the amount of addition of the rare-earth elements is not more than 0.1 g, it is not possible to obtain a sufficient effect, and even if the amount of addition of the rare-earth elements is not less than 500 g, it is not possible to obtain the effect corresponding to the amount of addition.

Although the state of existence of the rare-earth elements in the exhaust-gas-purifying catalyst is not particularly limited, it is preferable for them to be deposited on the sulfur-containing compound together with iridium.

The method for depositing the rare-earth elements on the sulfur-containing compound together with iridium is not particularly limited; normal depositing method is used. For example, the following methods are listed: (1) The sulfur-containing compound having iridium deposited thereon is mixed with the rare-earth oxides. (2) The rare-earth oxides are deposited on the sulfur-containing compound together with iridium at the same time. (3) Iridium is deposited on a mixture made by mixing the rare-earth oxides and the sulfur-containing compound. (4) A solution of a soluble compound of the rare-earth elements is allowed to penetrate the sulfur-containing compound having iridium deposited thereon, and this is dried and calcined.

It is preferable for the exhaust-gas-purifying catalyst to further contain, as the catalyst active ingredient for removing NOx, a compound of at least one element selected from the group consisting of tin, gallium, germanium and silicon in addition to iridium, sulfur and the rare-earth elements. This compound is not particularly limited, and an oxide of any of the above-mentioned elements is preferably used. Further, it is possible to form the above-mentioned compound into an oxide not only by adding the oxide of any of the above-mentioned elements, but also by adding any of the above-mentioned elements in the form of a chloride, etc. and then calcining it.

Moreover, the amount of addition of the compound of at least one element selected from the group consisting of a tin, gallium, germanium and silicon is preferably set in the range of 0.1 g to 500 g per 1 gram of iridium. If the amount is less than 0.1 g, it is not possible to obtain a sufficient effect, and even if the amount exceeds 500 g, it is not possible to obtain the effect corresponding to the amount of addition. Here, specific modes in the application of the above-mentioned catalyst are the same as those described earlier.

With respect to the exhaust-gas-purifying method of the present invention, it is preferable to set the gas space velocity of exhaust gas that is to pass through the exhaust-gas-purifying catalyst in the range of 5,000 to 200,000 $hr^{-1}$, while using any of the above-mentioned exhaust-gas-purifying catalyst. The speed of less than 5,000 $hr^{-1}$ requires a large catalyst capacity, raising a problem of costs, and the speed exceeding 200,000 $hr^{-1}$ reduces the purifying efficiency.

The exhaust gas temperature in the above-mentioned purifying method is preferably set in the range of 200° C. to 700° C., and more preferably set in the range of 250° C. to 600° C. If the temperature is less than 200° C., the purifying capability for NOx is extremely reduced, and if the temperature exceeds 700° C., the purifying efficiency is also reduced.

With the above-mentioned method, the exhaust-gas-purifying catalyst is effective even when the temperature of exhaust gas is still low so that it can exhibit the activity in a wider temperature range, especially in the NOx-removing process in an oxidizing atmosphere. In addition, since the exhaust-gas-purifying catalyst is superior in heat resistance and durability, it is preferably used for purifying exhaust gas from internal combustion engines, such as those of diesel engines and lean-burn engines, in which the exhaust gas forms an oxidizing atmosphere, and has a wide temperature-variation range.

With respect to the exhaust gas, any exhaust gas from gasoline engines used for car engines or from internal combustion engines, such as diesel engines, boilers and industrial plants, is used, and its composition is not particularly limited.

THE BEST MODE FOR CARRYING OUT THE INVENTION

Figure 1:
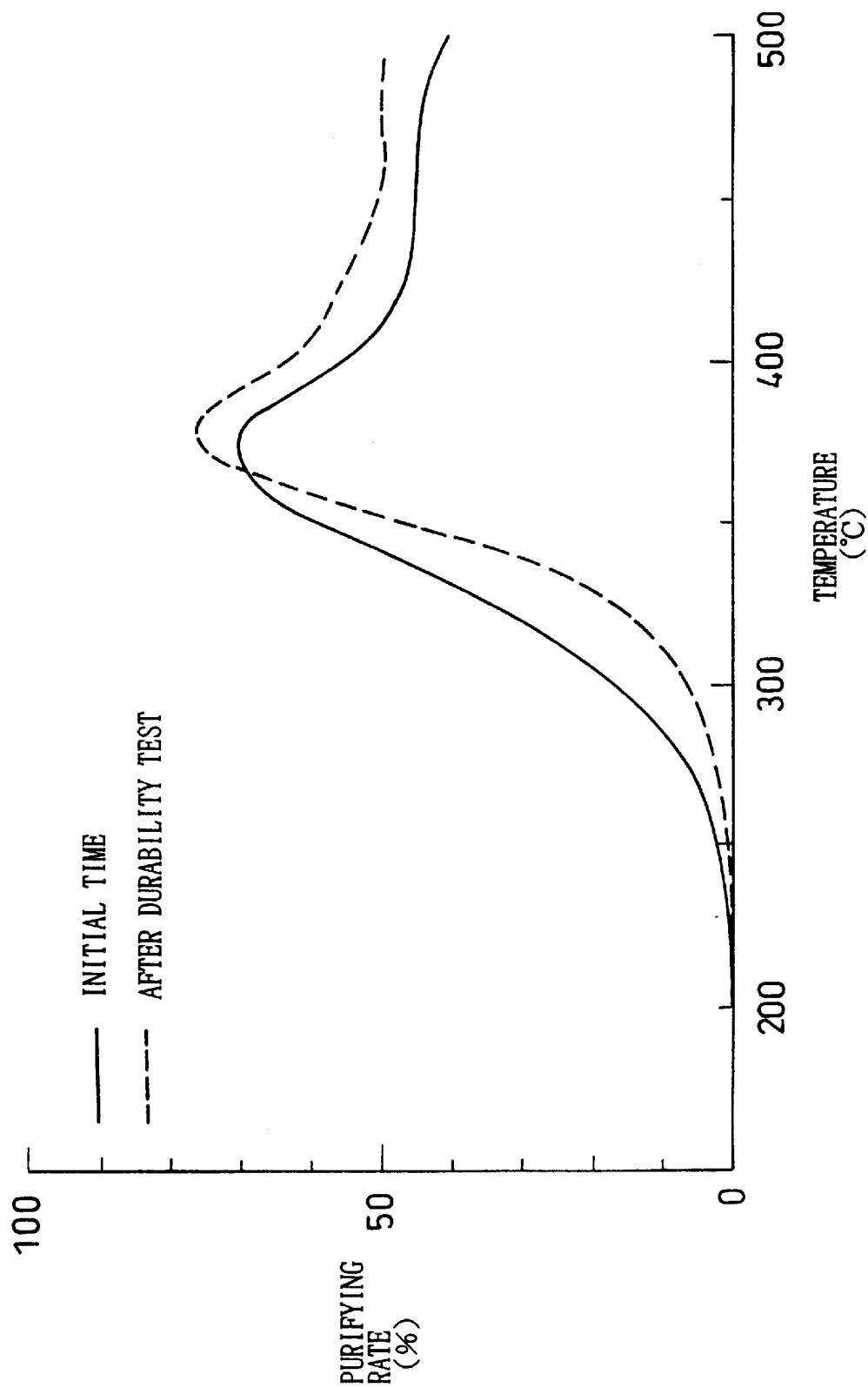
FIG. 1 is a graph that shows the light-off performances of NOx at the initial time and after a durability test respectively with respect to sample exhaust gas (in an oxidizing atmosphere) regarding finished catalyst (1) described in Example 1 of the exhaust-gas-purifying catalyst of the present invention.

The exhaust-gas-purifying catalyst of the present invention will be discussed based upon the manufacturing method thereof by means of Examples.

EXAMPLE 1

First, to 100 g of porous active alumina in powder having a BET (Brunauer-Emmett-Teller)-surface-area of 100 $m^2/g$ was added an aqueous solution of iridium chloride containing 5 g of iridium, and then mixed, and the resulting mixture was dried for two hours at 120OC, and successively calcined for two hours at 500° C. so that catalyst powder, which consists of active alumina having fine particles of iridium dispersed on its porous surface, was obtained.

Thereafter, the catalyst powder was wet ground by a ball mill, thereby obtaining aqueous slurry. Successively, a commercial cordierite honeycomb substrate (manufactured by NGK INSULATORS LTD., 33 mmφ in diameter, 76 mmL in length and 65 ml in volume, having 400 gas-permeable cells per 1 square inch in cross-section) was dipped into the aqueous slurry, and then excess aqueous slurry was removed from the honeycomb substrate by blowing it using compressed air.

Then, the honeycomb substrate, which had the aqueous slurry on the inside surfaces of each cell, was dried for two hours at 120° C., and successively calcined for two hours at 500° C. Further, the honeycomb substrate was dipped into an aqueous solution of sulfuric acid of 1.5 mol/liter, and then excessive sulfuric acid was removed therefrom by blowing it using compressed air, and dried for two hours at 120° C.; thus finished catalyst (1) was obtained. Finished catalyst (1) coated with 100 g of active alumina, 5 g of iridium and 5 g of sulfur per 1 liter of the honeycomb substrate; that is, it loaded 5% by weight of iridium and 5% by weight of sulfur with respect to active alumina that served as a support.

EXAMPLE 2

Finished catalyst (2) was obtained by carrying out the same processes as Example 1 except that 0.3 mol/liter of an aqueous solution of sulfuric acid was used instead of 1.5 mol/liter of an aqueous solution of sulfuric acid. Finished catalyst (2) loaded 100 g of active alumina, 5 g of iridium and 1 g of sulfur per 1 liter of the honeycomb substrate; that is, it loaded 5% by weight of iridium and 1% by weight of sulfur with respect to active alumina that served as a support.

EXAMPLE 3

Finished catalyst (3) was obtained by carrying out the same processes as Example 1 except that an aqueous solution of iridium chloride containing 1 g of iridium and 6 mol/liter of an aqueous solution of sulfuric acid were respectively used instead of an aqueous solution of iridium chloride containing 5 g of iridium and 1.5 mol/liter of an aqueous solution of sulfuric acid in Example 1. Finished catalyst (3) loaded 100 g of active alumina, 1 g of iridium and 20 g of sulfur per 1 liter of the honeycomb substrate; that is, it loaded 1% by weight of iridium and 20% by weight of sulfur with respect to active alumina that served as a support.

EXAMPLE 4

Finished catalyst (4) was obtained by carrying out the same processes as Example 1 except that an aqueous solution containing 27.2 g of potassium sulfate [$K_2SO_4$] was used instead of 1.5 mol/liter of an aqueous solution of sulfuric acid. Finished catalyst (4) loaded 100 g of active alumina, 5 g of iridium and 5 g of sulfur per 1 liter of the honeycomb substrate; that is, it loaded 5% by weight of iridium and 5% by weight of sulfur with respect to active alumina that served as a support.

EXAMPLE 5

Finished catalyst (5) was obtained by carrying out the same processes as Example 1 except that 100 g of barium sulfate [$BaSO_4$] was used instead of 100 g of active alumina and that the dipping process to the aqueous solution of sulfuric acid was omitted. Finished catalyst (5) loaded 100 g of barium sulfate, 5 g of iridium per 1 liter of the honeycomb substrate; that is, it loaded 5% by weight of iridium and 7.3% by weight of sulfur with respect to barium sulfate that served as a support.

EXAMPLE 6

Finished catalyst (6) was obtained by carrying out the same processes as Example 1 except that upon obtaining the aqueous slurry, 36.4 g of barium sulfate [$BaSO_4$] was added and that the dipping process to the aqueous solution of sulfuric acid was omitted from Example 1. Finished catalyst (6) loaded 5% by weight of iridium and 5% by weight of sulfur with respect to the active alumina serving as a support, and also loaded 3.7% by weight of iridium and 3.7% by weight of sulfur with respect to the total weight of the active alumina and barium sulfate.

EXAMPLE 7

Finished catalyst (7) was obtained by carrying out the same processes as Example 5 except that upon preparing the aqueous slurry in Example 5, 5 g of tin oxide ($SnO_2$) was further added. Finished product (7) further loaded 5% by weight of tin oxide with respect to barium sulfate serving as a support.

EXAMPLE 8

Finished catalyst (8) was obtained by carrying out the same processes as Example 7 except that 5 g of gallium oxide ($Ga_2O_3$) was added instead of tin oxide in Example 7. Finished product (8) further loaded 5% by weight of gallium oxide with respect to barium sulfate serving as a support.

EXAMPLE 9

Finished catalyst (9) was obtained by carrying out the same processes as Example 7 except that 5 g of germanium oxide ($GeO_2$) was added instead of tin oxide in Example 7. Finished product (9) further loaded 5% by weight of germanium oxide with respect to barium sulfate serving as a support.

EXAMPLE 10

Finished catalyst (10) was obtained by carrying out the same processes as Example 1 except that to the aqueous solution of iridium chloride in Example 1 was further added an aqueous solution of barium chloride containing 6.4 g of barium chloride [$BaCl_2.H_2O$]. Finished catalyst (10) loaded 100 g of active alumina, 5 g of iridium, 3.6 g of barium and 5 g of sulfur per 1 liter of the honeycomb substrate; that is, it loaded 5% by weight of iridium, 3.6% by weight of barium and 5% by weight of sulfur with respect to the active alumina that served as a support.

EXAMPLE 11

Finished catalyst (11) was obtained by carrying out the same processes as the above-mentioned Example (10) except that 0.3 mol/liter of an aqueous solution of sulfuric acid was used instead of 1.5 mol/liter of the aqueous solution of sulfuric acid in Example 10. Finished catalyst (11) loaded 5% by weight of iridium, 3.6% by weight of barium and 1% by weight of sulfur with respect to the active alumina that served as a support.

EXAMPLE 12

Finished catalyst (12) was obtained by carrying out the same processes as the above-mentioned Example (10) except that an aqueous solution of iridium chloride containing 1 g of iridium, an aqueous solution of barium chloride containing 1.3 g of barium chloride and 6 mol/liter of an aqueous solution of sulfuric acid were respectively used instead of the aqueous solution of iridium chloride containing 5 g of iridium, the aqueous solution of barium chloride containing 6.4 g of barium chloride and 1.5 mol/liter of the aqueous solution of sulfuric acid in Example 10. Finished catalyst (12) loaded 1% by weight of iridium, 0.7% by weight of barium and 20% by weight of sulfur with respect to the active alumina that served as a support.

EXAMPLE 13

Finished catalyst (13) was obtained by carrying out the same processes as Example 10 except that an aqueous solution containing 27.2 g of potassium sulfate [$K_2SO_4$] was used instead of 1.5 mol/liter of an aqueous solution of sulfuric acid in Example 10. Finished catalyst (13) loaded 5% by weight of iridium, 3.6% by weight of barium and 5% by weight of sulfur with respect to active alumina that served as a support.

EXAMPLE 14

Finished catalyst (14) was obtained by carrying out the same processes as Example 10 except that 100 g of barium sulfate [$BaSO_4$] was used instead of 100 g of active alumina and that the dipping process to the aqueous solution of sulfuric acid was omitted from Example 10. Finished catalyst (14) loaded 5% by weight of iridium, and contained 13.7% by weight of sulfur, with respect to barium sulfate that served as a support.

EXAMPLE 15

Finished catalyst (15) was obtained by carrying out the same processes as Example 10 except that upon obtaining the aqueous slurry, 36.4 g of barium sulfate [$BaSO_4$] was added and that the dipping process to the aqueous solution of sulfuric acid was omitted from Example 10. Finished catalyst (15) loaded 3.7% by weight of iridium, and contained 3.7% by weight of sulfur, with respect to the active alumina and barium sulfate serving as a support.

EXAMPLE 16

Finished catalyst (16) was obtained by carrying out the same processes as Example 10 except that an aqueous solution of calcium chloride containing 3.8 g of calcium chloride [$CaCl_2.2H_2O$] was added instead of barium chloride in Example 10. Finished catalyst (16) loaded 5% by weight of iridium and 1% by weight of calcium, and contained 5% by weight of sulfur, with respect to the active alumina serving as a support.

EXAMPLE 17

Zirconium oxide (specific surface area 50 $m^2/g$) was impregnated with an aqueous solution of cerium nitrate prepared by dissolving cerium nitrate into water so that the amount of cerium per 1 mol of zirconium corresponded to ¼ mol. Successively, the zirconium oxide, which had been impregnated with the aqueous solution of cerium nitrate, was dried, and then calcined at 500° C. in the air for two hours; thus, a complex oxide of cerium-zirconium (powder a) was obtained.

Next, finished catalyst (17) was obtained by carrying out the same processes as Example 5 except that upon preparing the aqueous slurry, 20 g of the complex oxide of cerium-zirconium was added. Finished catalyst (17) loaded 100 g of barium sulfate, 5 g of iridium and 20 g of the complex oxide of cerium-zirconium (zirconium:cerium=4:1 molar ratio) with respect to 1 liter of the honeycomb substrate.

EXAMPLE 18

Finished catalyst (18) was obtained by carrying out the same processes as Example 17 except that upon preparing powder a, a solution of lanthanum nitrate was further added so that lanthanum corresponds to ⅛ mol with respect to zirconium.

EXAMPLE 19

Finished catalyst (19) was obtained by carrying out the same processes as Example 18 except that a solution of yttrium nitrate was used instead of the solution of lanthanum nitrate.

EXAMPLE 20

Finished catalyst (20) was obtained by carrying out the same processes as Example 18 except that a solution of praseodymium nitrate was used instead of the solution of lanthanum nitrate.

EXAMPLE 21

Finished catalyst (20) was obtained by carrying out the same processes as Example 18 except that a solution of neodymium nitrate was used instead of the solution of lanthanum nitrate.

EXAMPLE 22

A mixed aqueous solution was prepared by mixing zirconium nitrate and cerium nitrate so that the molar ratio of zirconium and cerium was adjusted to 4:1. This mixed aqueous solution was neutralized by ammonia to produce a coprecipitate. The resulting coprecipitate was dried, and then calcined at 500° C. in the air for two hours; thus, a complex oxide of cerium-zirconium (powder b) was obtained.

Successively, finished catalyst (22) was obtained by carrying out the same processes as Example 17 except that 20 g of powder b was used instead of powder a.

EXAMPLE 23

50 g of cerium oxide (specific surface area 50 $m^2/g$) was impregnated with an aqueous solution of iron nitrate so that the molar ratio of cerium and iron was adjusted to 30:1, and this was dried and calcined at 500° C. in the air for two hours; thus, a complex oxide of cerium-iron (powder c) was obtained.

Successively, finished catalyst (23) was obtained by carrying out the same processes as Example 17 except that 20 g of powder c was used instead of powder a.

EXAMPLE 24

Finished catalyst (24) was obtained by carrying out the same processes as Example 23 except that a solution of cobalt nitrate was added instead of the solution of iron nitrate.

EXAMPLE 25

Finished catalyst (25) was obtained by carrying out the same processes as Example 23 except that a solution of nickel nitrate was added instead of the solution of iron nitrate.

EXAMPLE 26

Finished catalyst (26) was obtained by carrying out the same processes as Example 23 except that a solution of copper nitrate was added instead of the solution of iron nitrate.

EXAMPLE 27

Finished catalyst (27) was obtained by carrying out the same processes as Example 23 except that a solution of zinc nitrate was added instead of the solution of iron nitrate.

EXAMPLE 28

Finished catalyst (28) was obtained by carrying out the same processes as Example 23 except that a solution of manganese nitrate was added instead of the solution of iron nitrate.

EXAMPLE 29

Finished catalyst (29) was obtained by carrying out the same processes as Example 17 except that upon preparing the aqueous slurry, 5 g of tin oxide was added.

EXAMPLE 30

To 100 g of porous active alumina in powder having a BET-surface-area of 100 $m^2/g$ that serves as a fire-resistant inorganic compound was added an aqueous solution of chloroplatinic acid containing 5 g of platinum, and then mixed, and the resulting mixture was dried for two hours at 120° C., and successively calcined for two hours at 500° C. so that active alumina having platinum deposited thereon (powder d) was obtained.

Meanwhile, to 100 g of granular barium sulfate that serves as a metallic sulfate was added an aqueous solution of iridium chloride containing 5 g of iridium, and then mixed, and the resulting mixture was dried for two hours at 120° C., and successively calcined for two hours at 500° C. so that barium sulfate having iridium deposited thereon (powder e) was obtained.

Next, the above-mentioned powder d, powder e and 50 g of porous cerium oxide (powder f) in powder having a BET-surface-area of 50 $m^2/g$ were wet ground in a ball mill, thereby obtaining an aqueous slurry.

Successively, in the same manner as Example 1, a cordierite honeycomb substrate was coated with the aqueous slurry, and then dried and calcined; thus, finished catalyst (30) was obtained. Finished catalyst (30) loaded 100 g of active alumina, 5 g of platinum, 100 g of barium sulfate and 5 g of iridium per 1 liter of the honeycomb substrate.

EXAMPLE 31

A first aqueous slurry, obtained by wet grinding powder d and powder f in Example 30, was applied to the honeycomb substrate in the same way as Example 30, and this was dried and calcined. Then, a second aqueous slurry, obtained by wet grinding powder e in Example 30, was applied to the resulting honeycomb substrate having powder d and powder f coated thereon, and this was dried and calcined; thus, finished product (31) was obtained.

This finished catalyst (31) has a catalyst-ingredient multiple-layer structure in which a first catalyst layer having an ingredient structure of powders d+f in its internal layer, is allowed to contact the honeycomb substrate as a lower layer, while a second catalyst layer having an ingredient structure of powder e, as an upper layer, faces the honeycomb substrate with the first catalyst layer sandwiched in between.

Finished catalyst (31) loaded 100 g of active alumina, 5 g of platinum, 100 g of barium sulfate and 5 g of iridium per 1 liter of the honeycomb substrate serving as the base material.

EXAMPLE 32

First, to 100 g of the porous active alumina in powder having a BET-surface-area of 100 $m^2/g$ that serves as a base material was added and mixed an aqueous solution of chloroplatinic acid containing 10 g of platinum, and this was dried at 120° C. for two hours, and then calcined at 500° C. for two hours; thus, active alumina having platinum deposited thereon (powder d') was obtained.

Meanwhile, to 100 g of the aforementioned barium sulfate was added and mixed an aqueous solution of iridium chloride containing 10 g of iridium, and this was dried at 120° C. for two hours, and then calcined at 500° C. for two hours; thus, barium sulfate (powder e') having iridium deposited thereon was obtained.

Next, a third slurry, obtained by wet grinding powder f described in Example 30 and the above-mentioned powder d', was applied in the same manner as Example 30 except that a cordierite honeycomb substrate measuring 38 mm in length was used, and this was dried and calcined; thus, catalyst (32-1) (individual body) was obtained. This catalyst (32-1) loaded 100 g of active alumina and 10 g of platinum per 1 liter of the honeycomb substrate.

Further, a fourth slurry, obtained by wet grinding the aforementioned powder e', was applied in the same manner as Example 30 except that a cordierite honeycomb substrate measuring 38 mm in length was used, and this was dried and calcined; thus, catalyst (32-2) (individual body) was obtained. This catalyst (32-2) loaded 100 g of barium sulfate and 10 g of iridium per 1 liter of the honeycomb substrate.

Finished catalyst (32), constituted by catalyst (32-1) and catalyst (32-2), was obtained by placing catalyst (32-2) on the upstream side of an exhaust-gas flow and placing catalyst (32-1) on the downstream side of the exhaust-gas flow. Finished catalyst (32) loaded 50 g of active alumina, 5 g of platinum, 50 g of barium sulfate and 5 g of iridium per 1 liter of the entire honeycomb substrate.

EXAMPLE 33

Finished catalyst (33) was obtained by carrying out the same processes as Example 32 except that an aqueous solution of palladium nitrate containing 10 g of palladium instead of the aqueous solution of chloroplatinic acid containing 10 g of platinum in Example 32.

EXAMPLE 34

Finished catalyst (34) was obtained by carrying out the same processes as Example 32 except that an aqueous solution of rhodium nitrate containing 10 g of rhodium instead of the aqueous solution of chloroplatinic acid containing 10 g of platinum in Example 32.

EXAMPLE 35

Finished catalyst (35) was obtained by carrying out the same processes as Example 32 except that an aqueous solution of rhodium nitrate containing 2 g of rhodium instead of the aqueous solution of chloroplatinic acid containing 10 g of platinum in Example 32.

Next, in relation to the above-mentioned finished catalysts (1) through (35), explanations will be given of comparative catalysts (A) through (C) given in Comparative Examples 1 through 3 as well as conventional catalyst (D) given as the prior art based upon their respective manufacturing methods.

COMPARATIVE EXAMPLE 1

Comparative catalyst (A) was obtained by carrying out the same processes as Example 1 except that the dipping process to sulfuric acid was omitted from Example 1. Comparative catalyst (A) loaded 5 g of iridium with respect to 100 g of active alumina serving as a base material.

COMPARATIVE EXAMPLE 2

Comparative catalyst (B) was obtained by carrying out the same processes as Example 1 except that the dipping process to sulfuric acid was omitted from Example 10. Comparative catalyst (B) loaded 5 g of iridium with respect to 100 g of active alumina serving as a base material.

COMPARATIVE EXAMPLE 3

Comparative catalyst (C) was obtained by applying only the first slurry in Example 31. Comparative catalyst (C) loaded 5 g of platinum with respect to 100 g of active alumina serving as a base material.

PRIOR ART

Next, an explanation will be given of a copper-zeolite catalyst which was prepared especially in accordance with the method disclosed in Japanese Laid-Open Patent Publication No. 125250/1985 (Tokukaisho 60-125250) as a prior-art exhaust-gas purifying catalyst used in an oxidizing atmosphere.

First, a mixture, made by mixing 100 grams of zeolite of the ZSM-5 type ($SiO_2/Al_2O_3=40$) with 400 grams of pure water, was stirred for two hours at 98° C, and then 600 ml of an aqueous solution containing 0.2 mol/liter of copper-ammine complex was slowly dripped into the mixture at 80° C.

Thereafter, the zeolite containing the copper-ammine complex was obtained by filtering the mixture, and this was sufficiently rinsed, and then dried for 24 hours at 120° C. so that a zeolite catalyst in powder was obtained. The zeolite catalyst in powder was wet ground by a ball mill, and an aqueous slurry was obtained. Then, in the same manner as described in Embodiment 1, conventional catalyst (D) was obtained by using the aqueous slurry. Conventional catalyst (D) loaded 100 g of zeolite of the ZSM-5 type and 5.6 g of copper per 1 liter of the honeycomb substrate.

Next, with respect to finished catalysts (1) through (35), comparative catalysts (A) through (C) and conventional catalyst (D) that were prepared in Examples 1 through 35, Comparative Examples (A) through (C) and Prior Art, the performance on catalyst activity was evaluated with respect to the NOx-removing capability in an oxidizing atmosphere of the exhaust gas by using a model gas (corresponding to A/F=21) having the following reaction gas composition X that simulates an exhaust gas from a lean-burn engine that forms an oxidizing atmosphere.

Initial Performance Evaluation

The respective finished catalysts were loaded into stainless reaction tubes, each having 34.5 mmφ in diameter and 300 mm in length, so that catalyst beds were formed respectively, and then the following reaction gas composition X was introduced into the respective catalyst beds under a condition of a space velocity of 50000 $hr^{-1}$, while increasing the inlet temperature of the catalyst beds from 150° C. to 500° C. successively; thus, the NOx-purifying rate (the removing rate) was measured and the light-off performance of each of the catalysts was evaluated.

| (REACTION GAS COMPOSITION X) | |
|---|---|
| Nitrogen Monoxide (NO) | 300 ppm |
| Propylene ($C_3H_6$) | 3000 ppm (converted to methane) |
| Carbon monoxide (CO) | 0.18 volume % |
| Hydrogen ($H_2$) | 600 ppm |
| Oxygen ($O_2$) | 7 volume % |
| Vapor ($H_2O$) | 10 volume % |
| Carbon Dioxide ($CO_2$) | 10 volume % |
| Nitrogen ($N_2$) | the rest portion |

In this evaluation method, in order to evaluate the NOx-purifying process under an oxidizing atmosphere, the reaction gas composition X, which forms an exhaust gas from a gasoline engine corresponding to an air-fuel ratio of 21, was used as an example of exhaust gas compositions; however, the applicable exhaust gas composition is not intended to be limited thereby.

First, Table 1 shows the maximum NOx-purifying rate and the corresponding inlet temperature of the catalyst bed, which was set forth as the results of the initial (Fresh) performance evaluation on respective finished catalysts (1) through (9), comparative catalysts (A) through (C) and conventional catalyst (D).

TABLE 1

| | | Maximum NOx-Purifying Rate (%) / Catalyst Inlet Temperature (° C.) | |
|---|---|---|---|
| | Catalysts | Fresh | Aged |
| Example 1 | (1) | 72/375 | 78/380 |
| Example 2 | (2) | 66/380 | 72/390 |
| Example 3 | (3) | 60/385 | 70/400 |
| Example 4 | (4) | 64/390 | 70/400 |
| Example 5 | (5) | 68/380 | 74/375 |
| Example 6 | (6) | 66/375 | 70/375 |
| Example 7 | (7) | 66/375 | 79/385 |
| Example 8 | (8) | 73/377 | 78/390 |
| Example 9 | (9) | 72/380 | 77/388 |
| Comp. Ex. 1 | A | 54/400 | 58/415 |
| Comp. Ex. 2 | B | 50/400 | 44/415 |
| Comp. Ex. 3 | C | 60/252 | 38/280 |
| Prior Art | D | 78/395 | 58/415 |

Performance Evaluation After Durability Test

In order to carry out durability tests on the respective catalysts, the catalysts were loaded into multi-converters so that loaded catalyst beds were formed. Exhaust gas from a commercial lean-burn gasoline engine, which was adjusted to have an air-fuel ratio (A/F) of 21, was allowed to pass the respective loaded catalyst beds for 20 hours under conditions of a space velocity (S.V.) of 160000 $hr^{-1}$ and a catalyst-bed temperature of 700° C. Thus, the respective loaded catalyst beds were evaluated on their performance by using the method described in the aforementioned initial performance evaluation. The results of the respective tests are shown in Table 1.

Among the results, FIGS. 1 through 4 show the light-off performances after the initial time (Fresh) and the durability test (Aged) with respect to finished catalysts (1) and (5), comparative catalyst (A) and conventional catalyst (D). In the respective Figures, the results in the initial time (Fresh) are indicated by solid lines, and the results in after the durability test are indicated by broken lines.

First, as clearly shown by the results in Table 1, catalysts (1) through (9) of the present invention make it possible to remove NOx in an oxidizing atmosphere within a wider temperature range starting with a lower temperature (in the vicinity of 300° C.), as compared with comparative catalyst (A) and conventional catalyst (D). Further, since reduction in the catalyst activity is hardly observed even after the durability test (Aged), it is confirmed that they have sufficient heat-resistance and durability.

Figure 2:
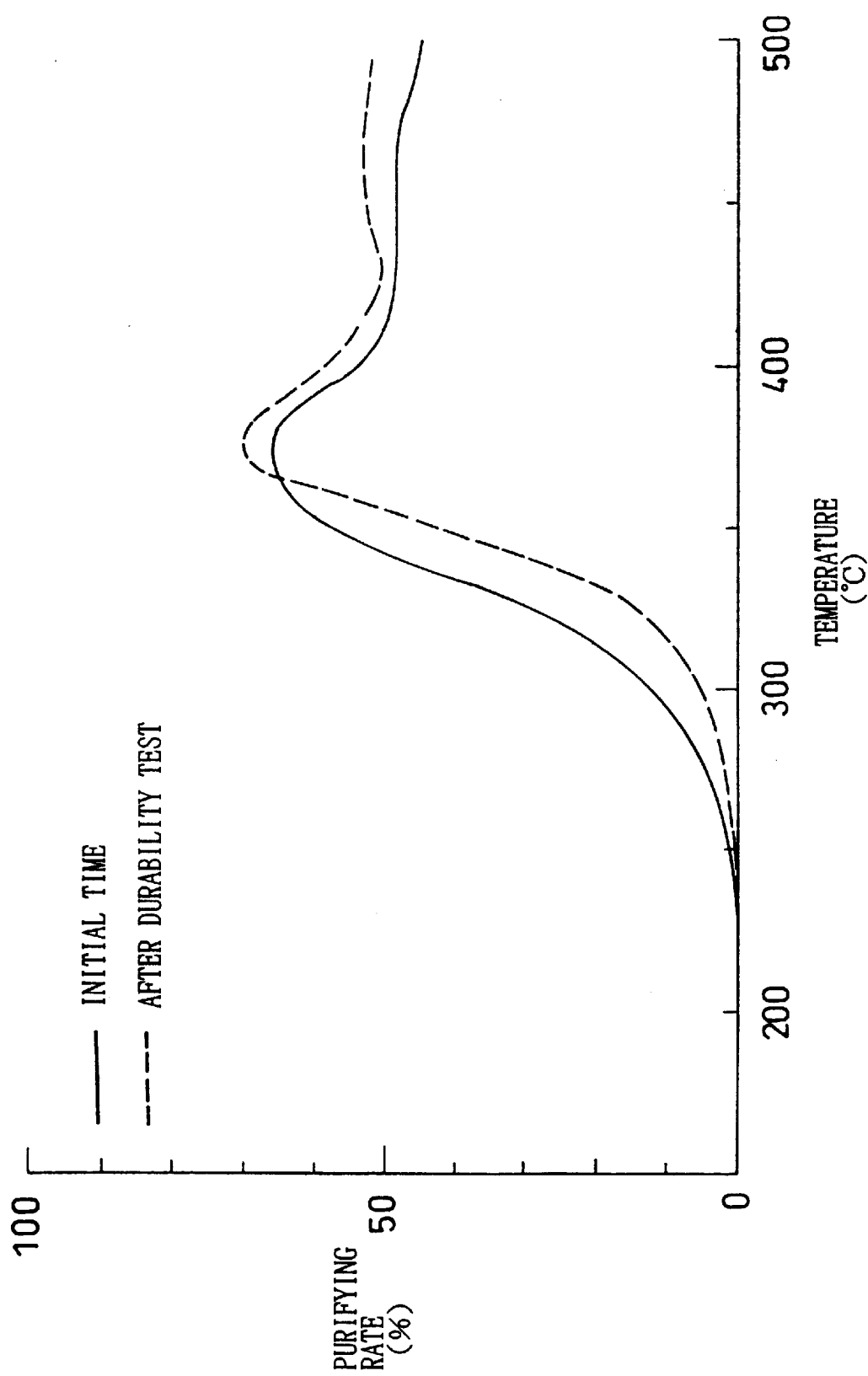
FIG. 2 is a graph that shows the light-off performances of NOx at the initial time and after a durability test respectively with respect to the sample exhaust gas regarding finished catalyst (5) described in Example 5 of the exhaust-gas-purifying catalyst of the present invention.
Figure 3:
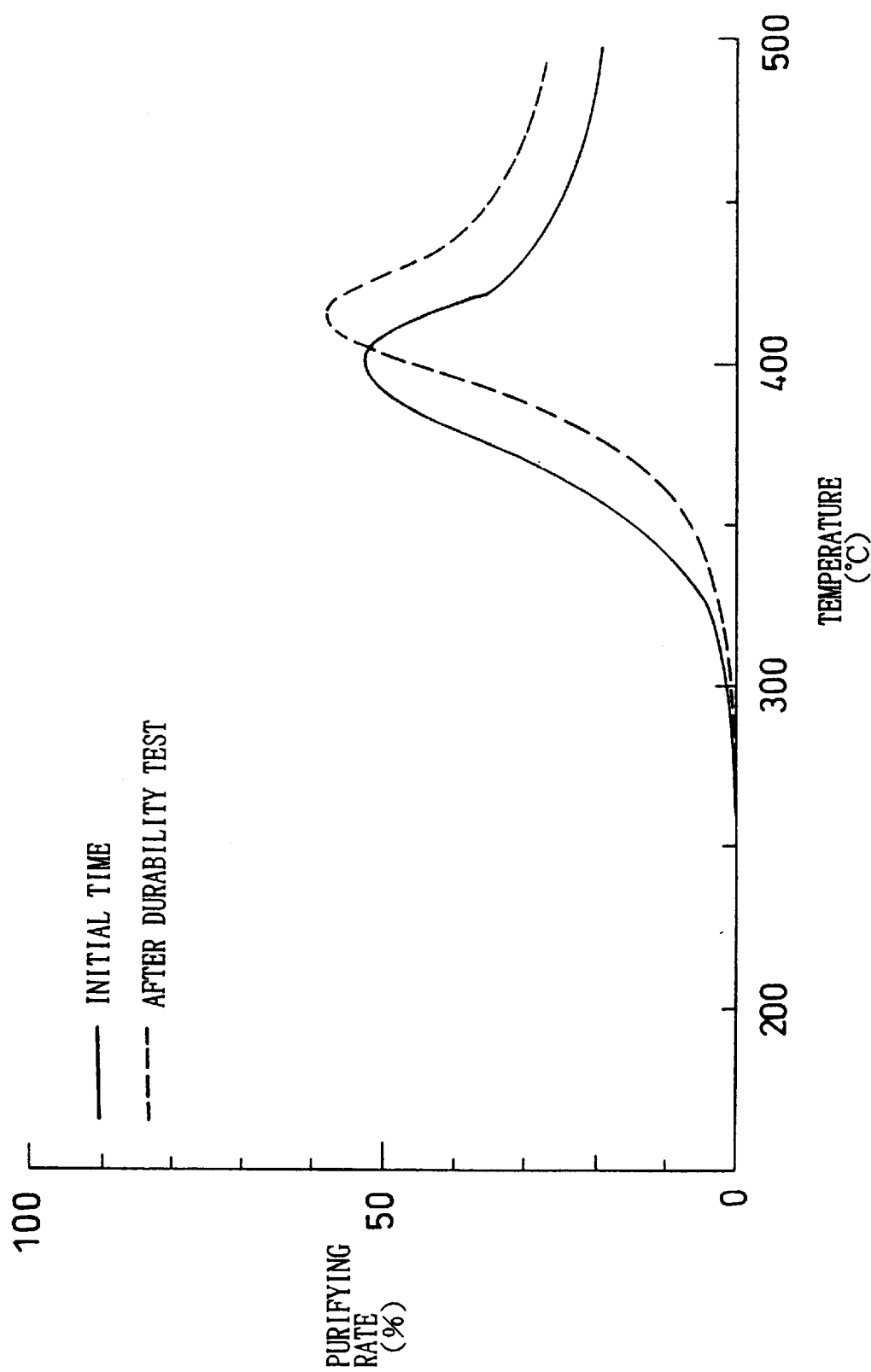
FIG. 3 is a graph that shows the light-off performances of NOx at the initial time and after a durability test respectively with respect to the sample exhaust gas regarding comparative catalyst (A) of Comparative Example 1.

Moreover, as is clearly shown by comparisons between FIGS. 1 and 2 and FIG. 3, the exhaust-gas purifying catalysts, which contain both iridium and sulfur, have an improved activity at high temperatures, and can purify NOx in a wider temperature range, as compared with catalyst (A) of Comparative Example 1 which has only iridium deposited thereon.

Figure 4:
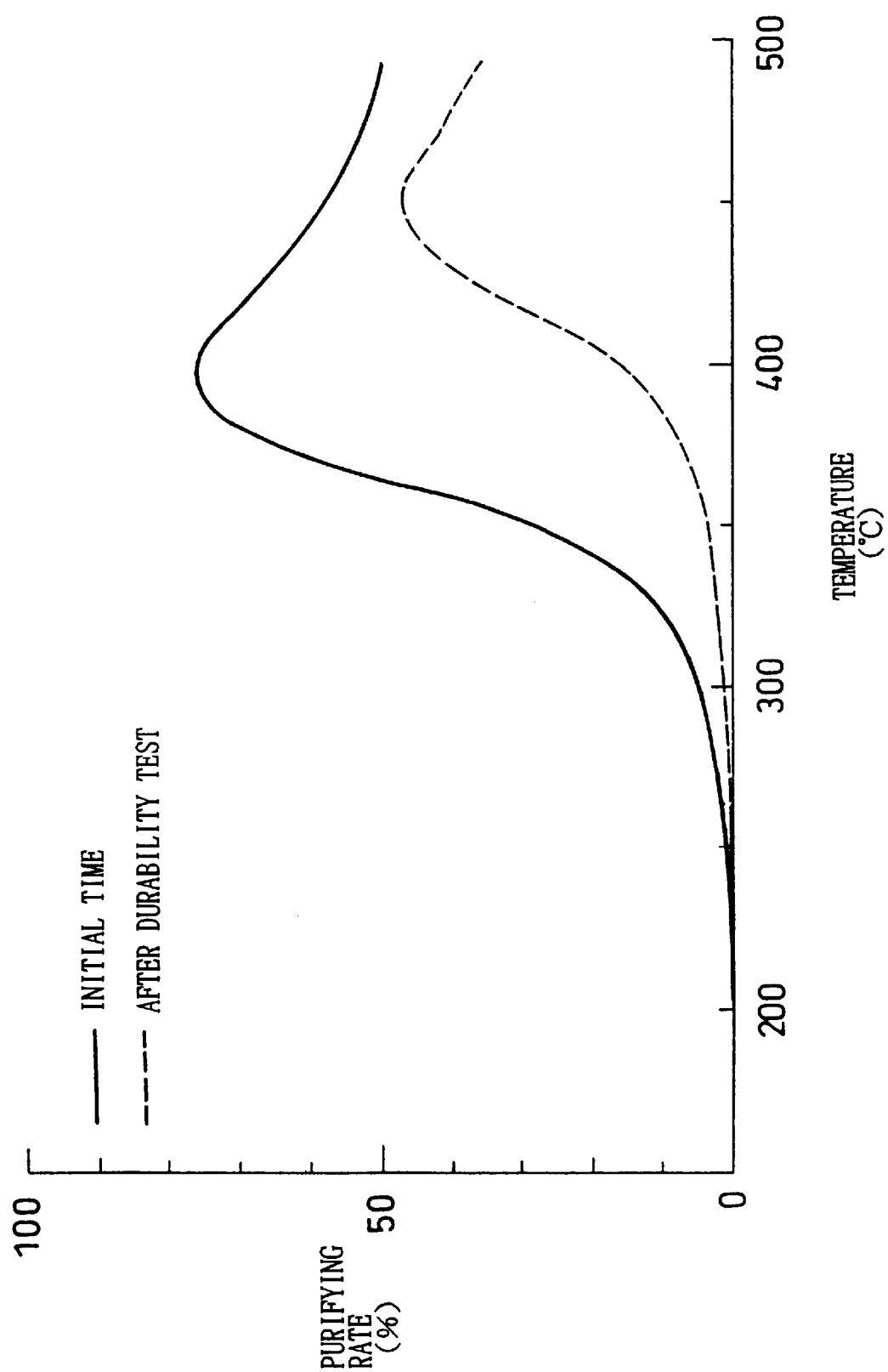
FIG. 4 is a graph that shows the light-off performances of NOx at the initial time and after a durability test respectively with respect to the sample exhaust gas regarding conventional catalyst (D).

Furthermore, as clearly shown by FIG. 4, conventional catalyst (D), which is a copper-ion exchanging zeolite catalyst known as an NOx-removing catalyst in an oxidizing atmosphere, showed a drastic reduction in the activity after the durability test. As shown in FIGS. 1 and 2, the present exhaust-gas-purifying catalysts, on the other hand, hardly showed any reduction in the activity even after the durability test. Therefore, the exhaust-gas-purifying catalysts have more sufficient heat-resistance and durability as compared with conventional catalyst (D).

Next, the aforementioned finished catalysts (10) through (16) were tested in accordance with the aforementioned evaluation method, and the results of evaluation are shown in Table 2.

TABLE 2

| Catalysts | | Maximum NOx-Purifying Rate (%) / Catalyst Inlet Temperature (° C.) | |
|---|---|---|---|
| | | Fresh | Aged |
| Example 10 | (10) | 68/380 | 72/395 |
| Example 11 | (11) | 62/390 | 66/400 |
| Example 12 | (12) | 56/385 | 62/405 |
| Example 13 | (13) | 60/400 | 68/410 |
| Example 14 | (14) | 64/385 | 74/395 |
| Example 15 | (15) | 62/380 | 66/390 |
| Example 16 | (16) | 66/395 | 66/410 |
| Comp. Ex. 1 | A | 54/400 | 58/415 |
| Comp. Ex. 2 | B | 50/400 | 44/415 |
| Comp. Ex. 3 | C | 60/252 | 38/280 |
| Prior Art | D | 78/395 | 58/415 |

Figure 5:
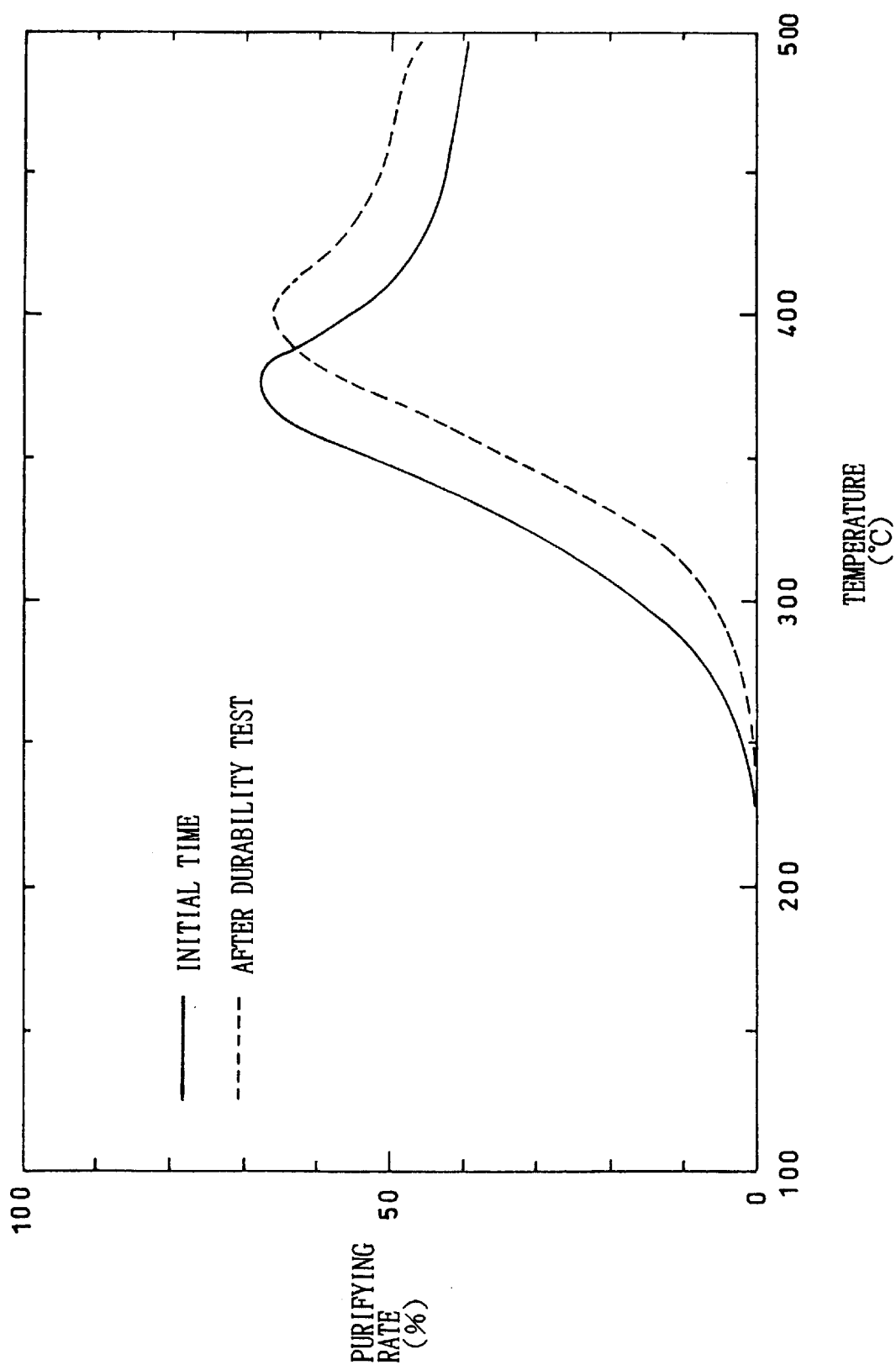
FIG. 5 is a graph that shows the light-off performances of NOx at the initial time and after a durability test respectively with respect to the sample exhaust gas regarding finished catalyst (10) described in Example 10 of the exhaust-gas-purifying catalyst of the present invention.
Figure 7:
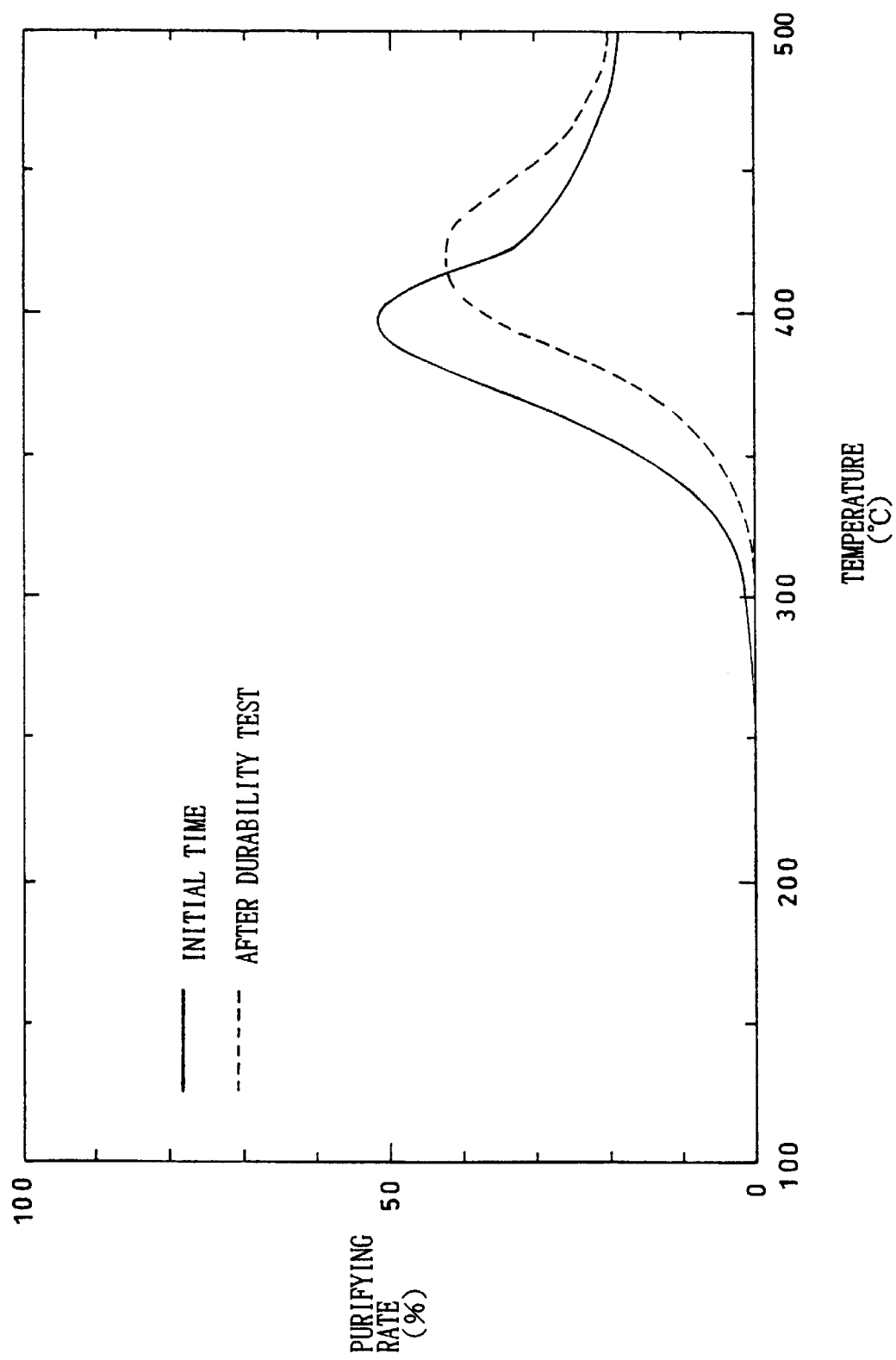
FIG. 7 is a graph that shows the light-off performances of NOx at the initial time and after a durability test respectively with respect to the sample exhaust gas regarding comparative catalyst (B) of Comparative Example 2.

Further, FIGS. 5 and 7 show the light-off performances in the initial time (Fresh) and after the durability test (Aged) with respect to the aforementioned finished catalysts (10) and (14) and comparative catalyst (B).

First, as clearly shown by the results of Table 2, it is confirmed that finished catalysts (10) through (16) of the respective examples of the present invention can remove NOx in an oxidizing atmosphere more efficiently, as compared with comparative catalyst (B) of comparative example 2, and that since they did not show any reduction in the catalyst activity even after the durability test (Aged), they have sufficient heat-resistance and durability.

In the case of conventional catalyst (D) of the prior art, although the NOx-removing rate at the initial time is high, the NOx-removing rate after the durability test decreases abruptly to approximately 5/7 of that before the durability test, as compared with finished catalysts (10) through (16). This shows that the respective catalysts (10) through (16) are superior in durability, and merely shows a small shift in the temperature at which the maximum NOx-removing rate after the durability test is marked, as compared with conventional catalyst (D).

As described above, the exhaust-gas-purifying catalysts are superior with an optimal temperature range at which the catalyst activity is effectively exerted without variation. Consequently, the exhaust-gas-purifying catalysts are superior in heat-resistance and durability as well as in stability on exhaust-gas purification.

Figure 6:
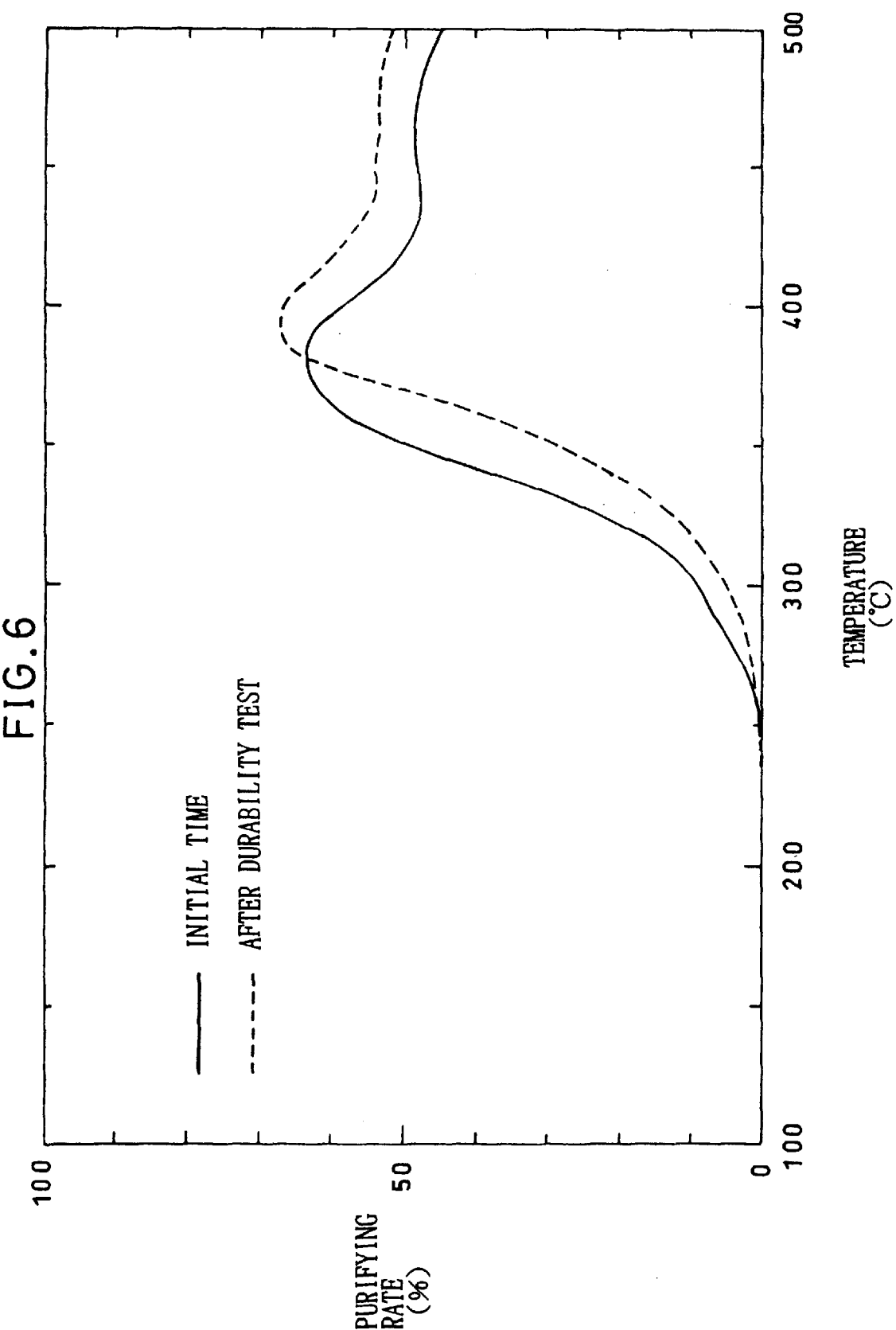
FIG. 6 is a graph that shows the light-off performances of NOx at the initial time and after a durability test respectively with respect to the sample exhaust gas regarding finished catalyst (14) described in Example 14 of the exhaust-gas-purifying catalyst of the present invention.

Moreover, as is clearly shown by comparisons between FIGS. 5 and 6 and FIG. 7, the exhaust-gas purifying catalysts, which contain both a complex oxide of iridium and sulfur, have an improved activity at high temperatures, and can purify NOx in a wider temperature range, as compared with catalyst (B) of Comparative Example 1 which has only a complex oxide of iridium deposited thereon.

Furthermore, as clearly shown by FIG. 4, conventional catalyst (D), which is a copper-ion exchanging zeolite catalyst known as an NOx-removing catalyst in an oxidizing atmosphere, showed a drastic reduction in the activity after the durability test.

As shown in FIGS. 5 and 6, the present exhaust-gas-purifying catalysts, on the other hand, hardly showed any reduction in the activity even after the durability test. Therefore, the exhaust-gas-purifying catalysts have more sufficient heat-resistance and durability as compared with conventional catalyst (D).

Next, the aforementioned finished catalysts (17) through (29) were tested in accordance with the aforementioned evaluation method, and the results of evaluation are shown in Table 3.

TABLE 3

| Catalysts | | Maximum NOx-Purifying Rate (%) / Catalyst Inlet Temperature (° C.) | |
|---|---|---|---|
| | | Fresh | Aged |
| Example 17 | (17) | 65/380 | 67/396 |
| Example 18 | (18) | 63/390 | 61/399 |
| Example 19 | (19) | 66/375 | 68/391 |
| Example 20 | (20) | 64/380 | 64/397 |
| Example 21 | (21) | 66/390 | 67/404 |
| Example 22 | (22) | 66/383 | 67/397 |
| Example 23 | (23) | 65/370 | 68/389 |
| Example 24 | (24) | 66/366 | 62/400 |
| Example 25 | (25) | 68/370 | 69/401 |
| Example 26 | (26) | 70/390 | 71/402 |
| Example 27 | (27) | 69/380 | 72/390 |
| Example 28 | (28) | 68/380 | 72/392 |
| Example 29 | (29) | 70/380 | 71/395 |
| Comp. Ex. 1 | A | 54/400 | 58/415 |
| Comp. Ex. 2 | B | 50/400 | 44/415 |
| Comp. Ex. 3 | C | 60/252 | 38/280 |
| Prior Art | D | 78/395 | 58/415 |

Figure 8:
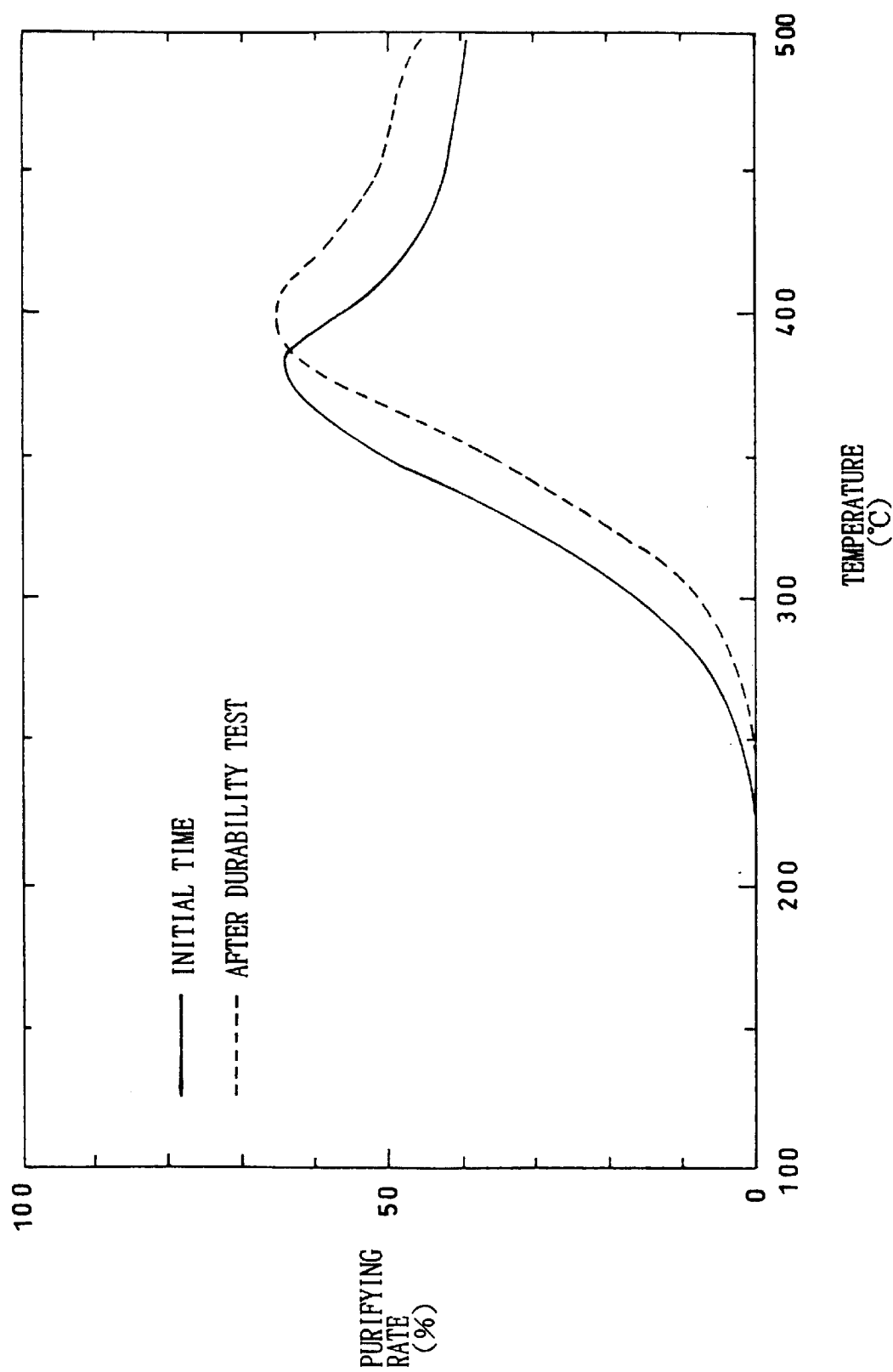
FIG. 8 is a graph that shows the light-off performances of NOx at the initial time and after a durability test respectively with respect to the sample exhaust gas regarding finished catalyst (17) described in Example 17 of the exhaust-gas-purifying catalyst of the present invention.

FIG. 8 shows the light-off performances in the initial time (Fresh) and after the durability test (Aged) with respect to the aforementioned finished catalysts (17).

First, as clearly shown by the results of Table 3, it is confirmed that finished catalysts (17) through (29) of the respective examples of the present invention, which contain iridium, a rare-earth element and sulfur, hardly showed any reduction in the NOx-purifying activity even after the durability test, and have superior heat-resistance and durability, as compared with comparative catalyst (A) of comparative example 1 which contains only iridium.

Moreover, as is clearly shown by the results of Table 3, it is confirmed that finished catalysts (17) through (29) hardly showed any reduction in the NOx-purifying activity after the durability test, and subsequently have sufficient heat-resistance and durability.

Furthermore, as clearly shown by comparisons between FIG. 8 and FIG. 4, finished catalyst (17), which contains iridium, a rare-earth element and sulfur, can remove NOx in an oxidizing atmosphere within a wider temperature range starting from a lower temperature, as compared with conventional catalyst (D) of the prior art.

In other words, as compared with conventional catalyst (D) in the prior art which merely has an NOx-purifying rate (conversion) of approximately 5% at 300° C., finished catalyst (17) has an NOx-purifying rate of not less than 15% at 300° C., which also achieves a superior NOx-removing rate at low temperatures. In addition, finished catalyst (17) has an improved activity at high temperatures, thereby achieving NOx-purification in a wider temperature range.

As clearly shown by FIG. 4, conventional catalyst (D) of the prior art showed a drastic reduction in the activity after the durability test, and showed a drastic shift to the high-temperature side, that is, to 350° C. in the rising temperature of the NOx-purifying activity.

In contrast, as shown in FIG. 8, finished catalyst (17) hardly showed any reduction in the activity even after the durability test, and also had a rising temperature of the NOx-purifying activity at approximately not less than 250° C., which showed a suppression in the shift to the high-temperature side in the rising temperature of the NOx-purifying activity. Therefore, the exhaust-gas-purifying catalyst has more sufficient heat-resistance and durability as compared with conventional catalyst (D).

Next, the aforementioned finished catalysts (30) through (35) were tested in accordance with the aforementioned evaluation method, and the results of evaluation are shown in Table 4.

TABLE 4

| Catalysts | Maximum NOx-Purifying Rate (%) / Catalyst Inlet Temperature (° C.) | |
| --- | --- | --- |
| | Fresh | Aged |
| Example 5 | (5) | 68/380 | 74/375 |
| Example 30 | (30) | 71/380 | 70/385 |
| Example 31 | (31) | 73/375 | 71/390 |
| Example 32 | (32) | 72/370 | 69/380 |
| Example 33 | (33) | 73/375 | 70/391 |
| Example 34 | (34) | 74/375 | 68/392 |
| Example 35 | (35) | 72/380 | 70/380 |
| Comp. Ex. 1 | A | 54/400 | 58/415 |
| Comp. Ex. 2 | B | 50/400 | 44/415 |
| Comp. Ex. 3 | C | 60/252 | 38/280 |
| Prior Art | D | 78/395 | 58/415 |

First, as clearly shown by the results of Table 4, it is confirmed that finished catalysts (30) through (35) remove or reduce NOx in exhaust gas in an oxidizing atmosphere not only in the initial time, but also after the durability test, as compared with comparative catalysts (A) through (C) and conventional catalyst (D).

Consequently, finished catalysts (30) through (35) also have resistance to poisoning due to sulfur oxides, etc. in exhaust gas, and exhibit superior durability.

Next, with respect to each of finished catalysts (5), (30) through (35) and (A) through (D) that were prepared in Examples 5 and 30 through 35, Comparative Examples (A) through (C) and Prior Art, the performance on catalyst activity was evaluated as follows:

Performance Evaluation on Simultaneous Removal of NOx, HC and CO

A model exhaust gas having the following reaction gas composition Y was introduced under a condition of a space velocity of 50000 hr$^{-1}$, while increasing the inlet temperature of the catalyst beds from 150° C. to 500° C. successively; thus, the respective purifying rates of NOx, HC and CO were measured and the performance of each of the catalysts was evaluated at respective temperatures. The reaction gas composition Y, which assumes an exhaust gas from a gasoline engine having a stoichiometric ratio that corresponds to an air-fuel ratio of 14.6, was used as an example of exhaust gas compositions; however, the applicable exhaust gas composition is not intended to be limited thereby.

| (REACTION GAS COMPOSITION X) | |
| --- | --- |
| Nitrogen Monoxide (NO) | 300 ppm |
| Propylene ($C_3H_6$) | 3000 ppm (converted to methane) |
| Carbon monoxide (CO) | 0.12 volume % |
| Hydrogen ($H_2$) | 0.4 volume % |
| Oxygen ($O_2$) | 1.24 volume % |
| Vapor ($H_2O$) | 10 volume % |
| Carbon Dioxide ($CO_2$) | 13 volume % |
| Nitrogen ($N_2$) | the rest portion |

Moreover, the results in the cases of catalyst inlet temperatures of 250° C. and 400° C. are shown in Table 5 respectively as results indicating the evaluation of the respective catalysts in the initial time (Fresh).

TABLE 5

| Catalysts | | Purifying Rate(%) at Fresh Time at 250° C./400° C. (Catalyst Inlet Temp.) in Composition Y | | |
| --- | --- | --- | --- | --- |
| | | HC | CO | NOx |
| Example 30 | (5) | 0/60 | 5/79 | 0/65 |
| Example 4 | (30) | 96/96 | 99/99 | 89/91 |
| Example 31 | (31) | 96/96 | 99/99 | 90/91 |
| Example 32 | (32) | 98/98 | 99/99 | 90/92 |
| Example 33 | (33) | 98/98 | 99/99 | 85/88 |
| Example 34 | (34) | 98/98 | 99/99 | 90/91 |
| Example 35 | (35) | 98/98 | 99/99 | 92/96 |
| Comp. Exam. 1 | A | 0/55 | 8/70 | 0/38 |
| Comp. Exam. 2 | B | 0/65 | 7/72 | 0/45 |
| Comp. Exam. 3 | C | 98/98 | 99/99 | 88/90 |
| Prior Art | D | 0/28 | 0/41 | 0/18 |

As clearly shown by the results of Table 5, it is confirmed that as compared with finished catalyst (5), comparative catalysts (A) and (B) and prior-art catalyst (D), finished catalysts (30) through (35), each of which contains an element such as platinum, can remove or reduce HC, CO and NOx more effectively with a wider temperature range starting with a lower exhaust gas temperature (in the vicinity of 200° C.) with respective to exhaust gas (reaction gas composition Y) that is resulted from burning of air and fuel at the stoichiometric ratio and that is more difficult in the purification of HC and CO as compared with exhaust gas (reaction gas composition X) in an oxidizing atmosphere.

Next, with respect to finished catalysts (5) and (30) through (35), comparative catalysts (A) through (C) and conventional catalyst (D) that were prepared in Examples (5) and (30) through (35), Comparative Examples 1 through 3 and the prior art, the performance evaluation on each catalyst was carried out in accordance with the aforementioned evaluation method. The results are respectively shown in Table 6.

TABLE 6

| Cata-lysts | | Purifying Rate(%) at Fresh Time at 250° C./400° C. (Catalyst Inlet Temp.) in Composition Y | | |
|---|---|---|---|---|
| | | HC | CO | NOx |
| Example 5 | (5) | 0/60 | 0/70 | 0/58 |
| Example 31 | (30) | 85/91 | 88/95 | 82/87 |
| Example 32 | (31) | 85/91 | 88/95 | 83/87 |
| Example 33 | (32) | 86/92 | 87/95 | 84/88 |
| Example 34 | (33) | 85/93 | 86/96 | 80/85 |
| Example 35 | (34) | 85/91 | 88/96 | 84/87 |
| Example 30 | (35) | 84/91 | 87/94 | 86/89 |
| Comp. Exam. 1 | A | 0/50 | 0/68 | 0/30 |
| Comp. Exam. 2 | B | 0/55 | 0/75 | 0/35 |
| Comp. Exam. 3 | C | 84/90 | 97/95 | 82/88 |
| Prior Art | D | 0/15 | 0/20 | 0/5 |

As clearly shown by the results in Table 6, it is confirmed that as compared with comparative catalysts (A) and (B) and conventional catalyst (D), finished catalysts (30) through (35) of the present invention hardly showed any reduction in the catalyst activity due to poisoning from sulfur oxides in exhaust gas (reaction gas composition Y) even after the durability test (Aged) that had been carried out for 20 hours at 700° C. of the catalyst inlet temperature, and consequently have sufficient heat-resistance and durability that are greater than those of comparative catalysts (A) through (C) and the conventional catalyst (D).

In this manner, as compared with conventional catalysts made by depositing iridium onto metallic carbides or metallic nitrides, the exhaust-gas-purifying catalysts of the present invention, which exhibits an NOx-removing activity similar to that of the conventional catalysts by using compounds having inexpensive sulfates instead of expensive metallic carbides or metallic nitrides, make it possible to reduce costs more effectively than the conventional catalysts.

Meanwhile, a base material such as $So_4/ZrO_2$, which serves as a support for a denitrating catalyst disclosed in Japanese Laid-Open Patent Publication No. 80315/1995 (Tokukaihei 7-80315), is a material called a solid-state hyper-strong acid. This solid-state hyper-strong acid is obtained by impregnating a hydride of zirconium or other elements with sulfuric acid, filtering and drying the hydride, and then preliminary calcining it; therefore, the denitrating catalyst using the solid-state hyper-strong acid as its support, requires time-consuming processes, such as the preliminary calcining operation, in its preparation.

However, the exhaust-gas-purifying catalyst of the present invention does not necessarily require a solid-state hyper-strong acid as its carrying state of a sulfate, and achieves the aforementioned effects of the present invention by merely depositing a metallic sulfate having iridium deposited thereon onto a metal oxide such as alumina; therefore, as compared with the above-mentioned patent publication, it makes it possible to eliminate the time-consuming processes in its preparation.

INDUSTRIAL APPLICABILITY

Since the exhaust-gas-purifying catalyst of the present invention has a composition containing iridium and sulfur, it exhibits an activity for removing NOx in an oxidizing atmosphere in a wider temperature range, and also has superior heat-resistance and durability; therefore, it is effectively used for an internal combustion engine, such as a diesel engine and lean-burn engine, whose exhaust gas forms an oxidizing atmosphere and has a wide range of temperature variation.

Another exhaust-gas-purifying catalyst of the present invention has a composition containing a fire-resistant inorganic compound having at least an element selected from the group consisting of platinum, palladium and rhodium deposited thereon and a metallic sulfate having iridium deposited thereon.

The above-mentioned composition exhibits a superior exhaust-gas-purifying capability with respect to a wide range of exhaust gas compositions from a reducing atmosphere to an oxidizing atmosphere, particularly exhibits an activity for removing NOx in an oxidizing atmosphere in a wider temperature range, and are superior in heat-resistance and durability. For this reason, the above-mentioned composition is effectively used for an internal combustion engine, such as a diesel engine and a lean-burn engine, whose exhaust gas forms an oxidizing atmosphere and has a wide range of temperature variation.

Still another exhaust-gas-purifying catalyst of the present invention contains iridium, sulfur, and at least one element selected from the group consisting of calcium, strontium and barium. With this composition, the catalyst exhibits a higher catalyst activity for removing NOx in a wider temperature range in an oxidizing atmosphere, has superior heat-resistance and durability especially in a high-temperature range, and makes it possible to suppress the variation of optimum temperatures of exhaust gas for the catalyst activity, and also to reduce costs; thus, the catalyst becomes suitable for practical use.

Therefore, the above-mentioned catalyst is effectively used for an internal combustion engine, such as a diesel engine, a lean-burn engine and an engine of the cylinder fuel-direct-injection type, whose exhaust gas forms an oxidizing atmosphere and has a wide range of temperature variation.

Still another exhaust-gas-purifying catalyst of the present invention contains iridium, a rare-earth metal and sulfur. With this composition, the exhaust-gas-purifying catalyst removes NOx efficiently not only in a reducing atmosphere but also in an oxidizing atmosphere, exhibits an NOx-removing activity in a wide temperature range, is superior in heat resistance and durability, and can suppress the temperature range at which the NOx-purifying performance is exerted from shifting toward the high-temperature side. Consequently, the above-mentioned catalyst is effectively used for an internal combustion engine, such as a diesel engine, a lean-burn engine and an engine of the cylinder fuel-direct-injection type, whose exhaust gas forms an oxidizing atmosphere and has a wide range of temperature variation.

Moreover, another exhaust-gas-purifying process of the present invention is a process for setting the temperature of exhaust gas at the inlet of the exhaust-gas-purifying catalyst in the range of 200° C. to 700° C.

With this process, the exhaust-gas-purifying catalyst, especially when removing NOx in an oxidizing atmosphere, becomes effective from the time when the temperature of exhaust gas is still low; therefore, it allows to exhibit its activity in a wider temperature range, and also to have superior heat-resistance and durability.

Consequently, the above-mentioned process is effectively used to purify exhaust gas from an internal combustion engine, such as a diesel engine, a lean-burn engine and a gasoline engine of the cylinder fuel-direct-injection type, which has a low exhaust-gas temperature so as to improve burning efficiency and fuel cost and whose exhaust gas forms an oxidizing atmosphere and has a wide range of temperature variation.

What is claimed is:

1. A catalyst for purifying exhaust gas comprising:
    a lower layer including a fire-resistant inorganic compound having at least one element selected from a group consisting of platinum, palladium and rhodium deposited thereon; and
    an upper layer on the lower layer where the upper layer includes a metallic sulfate including iridium deposited thereon.

2. The catalyst for purifying exhaust gas as defined in claim 1, wherein the metallic sulfate is a sulfate of an alkaline earth metal.

3. The catalyst for purifying exhaust gas as defined in claim 1, wherein onto the metallic sulfate having iridium deposited thereon is further deposited at least one element selected from the group consisting of tin, gallium, germanium and silicon.

4. A catalyst for purifying exhaust gas comprising:
    a fire-resistant inorganic compound having at least one element selected from a group consisting of platinum, palladium and rhodium deposited thereon; and
    a metallic sulfate having iridium deposited on the fire-resistant inorganic compound deposited thereon,
    wherein the metallic sulfate having iridium deposited thereon is on an upstream side of the catalyst facing an exhaust gas flow, and the fire-resistant inorganic compound having at least one element selected from the group consisting of platinum, palladium and rhodium deposited thereon is on a downstream side of the catalyst.

5. The catalyst for purifying exhaust gas as defined in claim 4, wherein the metallic sulfate is a sulfate of an alkaline earth metal.

6. The catalyst for purifying exhaust gas as defined in claim 4, wherein onto the metallic sulfate having iridium deposited thereon is further deposited at least one element selected from the group consisting of tin, gallium, germanium and silicon.

7. A catalyst for purifying exhaust gas comprising:
    a fire-resistant inorganic compound having at least one element selected from a group consisting of platinum, palladium and rhodium deposited thereon; and
    a metallic sulfate having iridium deposited thereon,
    wherein the metallic sulfate having iridium deposited thereon is on an upstream side of the catalyst, and the fire-resistant inorganic compound having at least one element selected from the group consisting of platinum, palladium and rhodium deposited thereon is on a downstream side of the catalyst.

8. The catalyst for purifying exhaust gas as defined in claim 7, wherein the metallic sulfate is a sulfate of an alkaline earth metal.

9. The catalyst for purifying exhaust gas as defined in claim 7, wherein onto the metallic sulfate having iridium deposited thereon is further deposited at least one element selected from the group consisting of tin, gallium, germanium and silicon.

10. An exhaust-gas purifying process comprising the steps of:
    preparing a catalyst by forming a lower layer of the catalyst including a fire-resistant inorganic compound having at least one element selected from a group consisting of platinum, palladium and rhodium deposited thereon, and forming an upper layer on the lower layer where the upper layer includes a metallic sulfate including iridium deposited thereon;
    setting an exhaust-gas temperature in a range of 200° C. to 700° C. at an inlet to the catalyst; and
    directing an exhaust gas from an internal combustion engine through the catalyst for purifying exhaust gas and reducing nitrogen oxides in the exhaust gas.

11. An exhaust-gas purifying process comprising the steps of:
    preparing a catalyst by forming a lower layer including a fire-resistant inorganic compound having at least one element selected from a group consisting of platinum, palladium and rhodium deposited thereon, and forming an upper layer on the lower layer wherein the upper layer includes a metallic sulfate including iridium deposited thereon;
    setting the exhaust-gas temperature in the range of 200° C. to 700° C. at the inlet of the catalyst for purifying exhaust gas; and
    allowing an exhaust gas from an internal combustion engine to pass through the catalyst for purifying exhaust gas so as to reduce nitrogen oxides in the exhaust gas.

* * * * *